(12) United States Patent
Salsich et al.

(10) Patent No.: US 9,878,393 B2
(45) Date of Patent: Jan. 30, 2018

(54) WELDING WIRE FEEDER POWER CONTROL SYSTEM AND METHOD

(71) Applicant: Illinois Tool Works Inc., Glenview, IL (US)

(72) Inventors: Anthony Van Bergen Salsich, Appleton, WI (US); Edward G. Beistle, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 522 days.

(21) Appl. No.: 13/834,345

(22) Filed: Mar. 15, 2013

(65) Prior Publication Data

US 2013/0327752 A1  Dec. 12, 2013

Related U.S. Application Data

(60) Provisional application No. 61/657,515, filed on Jun. 8, 2012.

(51) Int. Cl.
*B23K 9/10* (2006.01)
*B23K 15/00* (2006.01)
(Continued)

(52) U.S. Cl.
CPC ............ *B23K 9/124* (2013.01); *B23K 9/09* (2013.01); *B23K 9/1043* (2013.01)

(58) Field of Classification Search
None
See application file for complete search history.

(56) References Cited

U.S. PATENT DOCUMENTS 3,562,487 A   2/1971   Nelson
4,034,184 A   7/1977   Fernicola
(Continued)

FOREIGN PATENT DOCUMENTS

CN   1255418   6/2000
CN   2684986   3/2005
(Continued)

OTHER PUBLICATIONS

International Search Report from PCT application No. PCT/US2013/044236 dated Oct. 21, 2013, 10 pgs.
(Continued)

*Primary Examiner* — David Angwin
*Assistant Examiner* — Gyounghyun Bae
(74) *Attorney, Agent, or Firm* — McAndrews, Held & Malloy, Ltd.

(57) ABSTRACT

A method of operating a welding wire feeder includes receiving an input power signal from a power source and converting the input power signal to a bus power signal on an internal bus at a first time with a boost converter. The method also includes detecting bus voltage and bus current of the bus power signal on the internal bus and converting the bus power signal to a welding output signal at a second time with a buck converter. The welding output signal is suitable for a controlled waveform welding process. The method also includes detecting output voltage and output current of the weld output, and reducing a voltage ripple on the internal bus based at least in part on the detected bus and output current and/or voltages.

7 Claims, 14 Drawing Sheets

(51) Int. Cl.
  *B23K 9/09*  (2006.01)
  *B23K 9/12*  (2006.01)
  *G05F 1/00*  (2006.01)

(56) References Cited

U.S. PATENT DOCUMENTS

| | | | |
|---|---|---|---|
| 4,246,463 A * | 1/1981 | Shutt | B23K 9/188 |
| | | | 219/122 |
| 4,247,751 A | 1/1981 | Ashton | |
| 4,435,632 A | 3/1984 | Risberg | |
| 4,464,558 A | 8/1984 | Mizuno | |
| 4,508,954 A | 4/1985 | Kroll | |
| 4,584,458 A | 4/1986 | Tremblay | |
| 4,692,585 A | 9/1987 | Zaruba | |
| 4,769,754 A | 9/1988 | Reynolds | |
| 4,818,313 A * | 4/1989 | Sundberg | B06B 1/0253 |
| | | | 156/366 |
| 4,876,433 A | 10/1989 | Kashima | |
| 4,947,021 A | 8/1990 | Stava | |
| 4,963,715 A | 10/1990 | Tuttle | |
| 4,964,029 A * | 10/1990 | Severinsky | 363/80 |
| 5,025,127 A | 6/1991 | Gilliland | |
| 5,235,504 A * | 8/1993 | Sood | 363/53 |
| 5,278,390 A * | 1/1994 | Blankenship | B23K 9/0953 |
| | | | 219/125.1 |
| 5,343,017 A | 8/1994 | Karino | |
| 5,602,463 A * | 2/1997 | Bendall | G05F 1/62 |
| | | | 323/266 |
| 5,852,278 A | 12/1998 | Tanaka | |
| 5,991,169 A * | 11/1999 | Kooken | 363/17 |
| 6,023,037 A * | 2/2000 | Church | 219/121.39 |
| 6,207,929 B1 | 3/2001 | Stava | |
| 6,248,976 B1 | 6/2001 | Blankenship | |
| 6,469,478 B1 * | 10/2002 | Curtin | H02M 3/156 |
| | | | 323/266 |
| 6,504,132 B1 * | 1/2003 | Church | 219/130.1 |
| 6,515,259 B1 * | 2/2003 | Hsu | B23K 9/092 |
| | | | 219/130.31 |
| 6,552,303 B1 | 4/2003 | Blankenship | |
| 6,798,177 B1 * | 9/2004 | Liu | H02M 3/1582 |
| | | | 323/222 |
| 6,982,398 B2 | 1/2006 | Albrecht | |
| 7,064,290 B2 * | 6/2006 | Blankenship | B23K 9/1062 |
| | | | 219/130.21 |
| 7,072,774 B1 * | 7/2006 | Houston | B23K 9/0953 |
| | | | 219/69.15 |
| 7,091,445 B2 * | 8/2006 | Myers | B23K 9/093 |
| | | | 219/130.32 |
| 7,183,517 B2 | 2/2007 | Albrecht | |
| 7,218,081 B2 * | 5/2007 | Jang | H02M 3/335 |
| | | | 323/222 |
| 7,336,059 B2 * | 2/2008 | Steigerwald | H01F 6/006 |
| | | | 323/225 |
| 7,782,032 B2 * | 8/2010 | Taufik | 323/272 |
| 7,838,797 B2 | 11/2010 | Albrecht | |
| 7,842,903 B2 * | 11/2010 | Myers | B23K 9/1062 |
| | | | 219/130.21 |
| 8,080,761 B2 | 12/2011 | Matthews | |
| 8,264,188 B2 | 9/2012 | Veik | |
| 8,269,141 B2 | 9/2012 | Daniel | |
| 8,395,085 B2 | 3/2013 | Schartner | |
| 8,405,001 B2 | 3/2013 | Albrecht | |
| 8,569,652 B2 | 10/2013 | Albrecht | |
| 8,735,775 B2 | 5/2014 | Kaufman | |
| 8,736,240 B2 * | 5/2014 | Liu | H02M 3/335 |
| | | | 307/46 |
| 8,759,714 B2 | 6/2014 | Fosbinder | |
| 8,841,583 B2 | 9/2014 | Albrecht | |
| 8,975,558 B2 | 3/2015 | Stava | |
| 9,089,922 B2 * | 7/2015 | Bunker | B23K 9/1056 |
| 2003/0136774 A1 | 7/2003 | Nikodym | |
| 2004/0089645 A1 | 5/2004 | Saccon | |
| 2004/0222203 A1 | 11/2004 | Holverson | |
| 2004/0245230 A1 | 12/2004 | Huismann | |
| 2005/0051524 A1 | 3/2005 | Blankenship | |
| 2005/0061791 A1 | 3/2005 | Matus | |
| 2005/0109749 A1 | 5/2005 | Karino | |
| 2005/0199605 A1 | 9/2005 | Furman | |
| 2006/0011595 A1 * | 1/2006 | Daniel | B23K 9/1006 |
| | | | 219/130.1 |
| 2006/0037953 A1 | 2/2006 | Matthews | |
| 2006/0050464 A1 | 3/2006 | Von Arx | |
| 2006/0171090 A1 | 8/2006 | Enyedy | |
| 2006/0175313 A1 * | 8/2006 | Kooken | B23K 9/09 |
| | | | 219/130.1 |
| 2006/0213890 A1 * | 9/2006 | Kooken | B23K 9/095 |
| | | | 219/130.21 |
| 2007/0051712 A1 * | 3/2007 | Kooken | B23K 9/095 |
| | | | 219/130.1 |
| 2007/0080154 A1 | 4/2007 | Ott | |
| 2007/0158324 A1 * | 7/2007 | O'Donnell | B23K 9/1068 |
| | | | 219/137.71 |
| 2007/0181547 A1 * | 8/2007 | Vogel | B23K 9/1081 |
| | | | 219/130.1 |
| 2007/0181553 A1 | 8/2007 | Stanzel | |
| 2007/0187376 A1 | 8/2007 | Albrecht | |
| 2008/0087653 A1 | 4/2008 | Furman | |
| 2009/0201704 A1 | 8/2009 | Sickels | |
| 2010/0155384 A1 | 6/2010 | Albrecht | |
| 2010/0170880 A1 * | 7/2010 | Hsu | 219/130.1 |
| 2010/0187210 A1 | 7/2010 | Albrecht | |
| 2011/0049116 A1 | 3/2011 | Rappl | |
| 2011/0196915 A1 | 8/2011 | Kim | |
| 2011/0204074 A1 | 8/2011 | Schartner | |
| 2011/0220620 A1 | 9/2011 | Vogel | |
| 2011/0309054 A1 | 12/2011 | Salsich | |
| 2011/0309062 A1 | 12/2011 | ODonnell | |
| 2012/0097644 A1 | 4/2012 | Ott | |
| 2013/0112675 A1 | 5/2013 | Peters | |
| 2013/0114306 A1 * | 5/2013 | Kooken | 363/21.01 |
| 2014/0097164 A1 | 4/2014 | Beistle | |

FOREIGN PATENT DOCUMENTS

| | | |
|---|---|---|
| CN | 1633345 | 6/2005 |
| CN | 1765556 | 5/2006 |
| CN | 101360580 | 2/2009 |
| CN | 101370610 | 2/2009 |
| CN | 101374627 | 2/2009 |
| CN | 101856763 | 10/2010 |
| CN | 102448653 | 5/2012 |
| DE | 102007007287 | 8/2008 |
| EP | 1586403 | 10/2005 |
| EP | 2345500 | 7/2011 |
| JP | 2003191075 | 7/2003 |

OTHER PUBLICATIONS

International Search Report from PCT application No. PCT/US2014/053023, dated Feb. 5, 2015, 12 pgs.
International Search Report from PCT application No. PCT/US2013/044596 dated Oct. 17, 2013, 9 pgs.
International Search Report from PCT application No. PCT/US2013/044284 dated Feb. 17, 2014, 8 pgs.
International Search Report from PCT application No. PCT/US2013/044597 dated Apr. 10, 2014, 13 pgs.

* cited by examiner

WELDING WIRE FEEDER POWER CONTROL SYSTEM AND METHOD

CROSS-REFERENCE TO RELATED APPLICATION

This application claims priority from and the benefit of U.S. Provisional Application Ser. No. 61/657,515, entitled "WELDING WIRE FEEDER POWER CONTROL SYSTEM AND METHOD," filed Jun. 8, 2012, which is hereby incorporated by reference in its entirety for all purposes.

BACKGROUND

The invention relates generally to welding systems, and, more particularly, to welding wire feeder power control systems and methods.

Welding systems support a variety of processes, such as metal inert gas (MIG) welding, tungsten inert gas (TIG) welding, stick welding, and so forth, which may operate in different modes, such as constant current or constant voltage. Certain welding applications, such as boiler servicing and repair, shipyard work, construction, and so forth, may position a welding location or workpiece large distances from a welding power source.

MIG techniques allow for formation of a continuing weld bead by feeding welding wire shielded by inert gas from a welding torch. Electrical power is applied to the welding wire and a circuit is completed through the workpiece to sustain an arc that melts the wire and the workpiece to form the desired weld. Advanced forms of MIG welding are based upon generation of pulsed power. Mismatches between the input power and pulsed welding output create a voltage ripple of excess power to be stored within the welding system. Large magnitude voltage ripples are stored in large capacitors within the welding system. Voltage ripple may also affect the weld quality of the pulsed welding output.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a welding wire feeder includes a welding wire feed drive configured to drive welding wire towards a welding application and wire feed control circuitry coupled to the welding wire feed drive. The wire feed control circuitry is also configured to control the drive of welding wire towards the welding application. The welding wire feeder also includes a boost converter configured to receive input power and to convert the input power to bus power applied to an internal bus, and a buck converter coupled to the internal bus and configured to convert the bus power to welding output suitable for a welding application. The welding wire feeder also includes input voltage and current sensors configured to measure input voltage and current of the input power, respectively, and output voltage and current sensors configured to measure output voltage and current of the welding output, respectively. The welding wire feeder also includes control circuitry coupled to the boost and buck converters and to the input and output voltage and current sensors. The control circuitry is configured to drive the boost converter to reduce voltage ripple on the internal bus based upon at least one of the input voltage, the input current, the output voltage, or the output current.

In another embodiment, a welding wire feeder includes a welding wire feed drive configured to drive welding wire towards a welding application and wire feed control circuitry coupled to the welding wire feed drive. The wire feed control circuitry is also configured to control the drive of welding wire towards the welding application. The welding wire feeder also includes a boost converter configured to receive input power and to convert the input power to bus power applied to an internal bus, and a buck converter coupled to the internal bus. The buck converter is configured to draw the bus power from the internal bus and to convert the bus power to welding output suitable for a welding application. The welding wire feeder also includes bus voltage and current sensors configured to measure bus voltage and current of the bus power, respectively. The welding wire feeder also includes control circuitry coupled to the boost and buck converters and to the bus voltage and current sensors. The control circuitry is configured to reduce voltage ripple on the internal bus by driving the boost converter or buck converter to adjust a relative time difference between applying the bus power to the internal bus and drawing the bus power from the internal bus based at least in part upon the bus current or voltage.

In another embodiment, a method of operating a welding wire feeder includes receiving an input power signal from a power source and converting the input power signal to a bus power signal on an internal bus at a first time with a boost converter. The method also includes detecting bus voltage and bus current of the bus power signal on the internal bus and converting the bus power signal to a welding output signal at a second time with a buck converter. The welding output signal is suitable for a controlled waveform welding process. The method also includes detecting output voltage and output current of the weld output, and reducing a voltage ripple on the internal bus based at least in part on the detected bus and output current and/or voltages.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
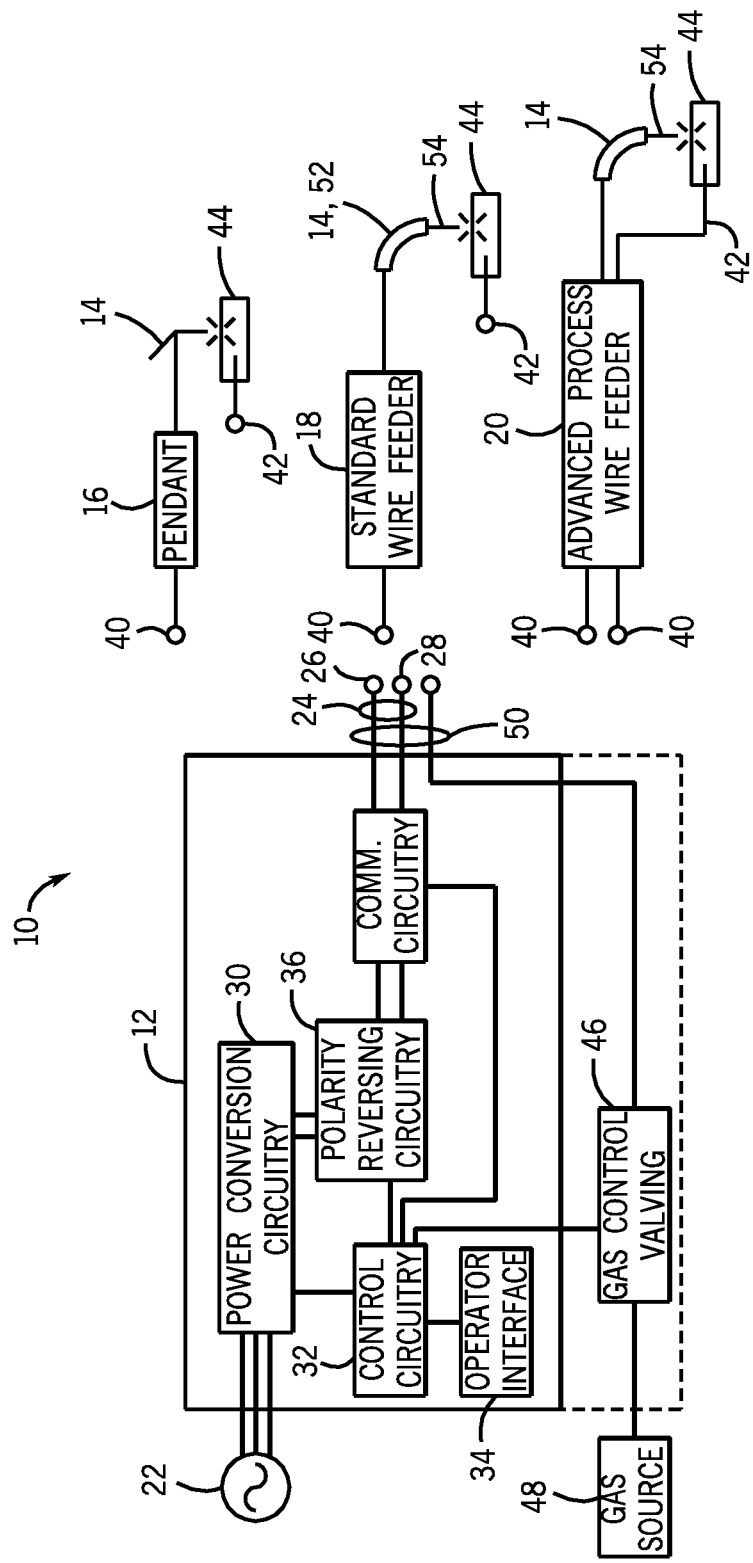
FIG. 1 is a block diagram of a welding system having a welding power source and an advanced process wire feeder in accordance with aspects of the present disclosure.

FIG. 1 is a block diagram of an embodiment of a welding system 10 which powers a welding application. As illustrated, the welding system 10 includes a welding power source 12 and a coupled welding torch 14. The welding power source 12 supplies input power to the welding torch 14. The welding torch 14 may be a torch configured for stick welding, tungsten inert gas (TIG) welding, or gas metal arc welding (GMAW), based on the desired welding application. In some embodiments, the welding power source 12 supplies input power to a pendant 16 coupled to a torch 14 configured for stick welding or TIG welding. The operator supplies the filler metal, if any, for stick or TIG welding. The pendant 16 may be configured to control the power source 12 and/or notify the operator of welding parameters. In other embodiments, the welding power source 12 supplies input power to a standard wire feeder 18. The standard wire feeder 18 supplies the input power and filler metal to a welding torch 14 configured for GMAW welding or flux core arc welding (FCAW). In some embodiments, the welding power source 12 supplies input power to an advanced process wire feeder 20. The advanced process wire feeder 20 is configured to convert the input power of the welding power source 12 to welding output. In some embodiments, the welding output of the advanced process wire feeder 20 may be a controlled waveform welding output. Controlled waveform welding outputs include welding outputs adapted to a pulsed welding process or a short circuit welding process.

The welding power source 12 is coupled to an alternating current (AC) source 22, such as an electrical grid or engine-driven generator that supplies primary power. The welding power source 12 may process the primary power to input power supplied to the welding torch 14 via power cables 24. In some embodiments, the power cables 24 includes a first terminal 26 and a second terminal 28, wherein one terminal has a positive polarity and the other has a negative polarity. Power conversion circuitry 30 converts the AC current to input power as either direct current (DC) or AC. The power conversion circuitry 30 may include circuit elements such as transformers, switches, boost converters, inverters, and so forth, capable of converting power as dictated by the demands of the welding system 12. In some embodiments, the power conversion circuitry 30 is configured to convert the primary power to an approximately 80V DC input power to supply the pendant 16, standard wire feeder 18, or advanced process wire feeder 20. The input power may be between approximately 50 to 120V DC.

The welding power source 12 includes control circuitry 32 and an operator interface 34. The control circuitry 32 controls the operations of the welding power source 12 and may receive input from the operator interface 34 through which an operator may choose a welding process (e.g., stick, TIG, MIG) and input desired parameters of the input power (e.g., voltages, currents, particular pulsed or non-pulsed welding regimes, and so forth). The control circuitry 32 may be configured to receive and process a plurality of inputs regarding the performance and demands of the system 12. The control circuitry 102 may include volatile or non-volatile memory, such as ROM, RAM, magnetic storage memory, optical storage memory, or a combination thereof. In addition, a variety of control parameters may be stored in the memory along with code configured to provide a specific output (e.g., reverse polarity, pre-charge capacitor, enable gas flow, etc.) during operation.

The welding power source 12 may include polarity reversing circuitry 36 and communications circuitry 38 coupled to the control circuitry 32. The polarity reversing circuitry 36 reverses the polarity of the first and second terminals 26, 28 when directed by the control circuitry 32. For example, some welding processes, such as TIG welding, may enable a desired weld when the electrode has a negative polarity, known as DC electrode negative (DCEN). Other welding processes, such as stick or GMAW welding, may enable a desired weld when the electrode has a positive polarity, known as DC electrode positive (DCEP). When switching between a TIG welding process and a GMAW welding process, the polarity reversing circuitry 36 may be configured to reverse the polarity from DCEN to DCEP. The operator may reverse the polarity manually, or the control circuitry 32 may direct the polarity reversing circuitry 36 to reverse the polarity in response to signals received through the communications circuitry 38. The communications circuitry 38 is configured to communicate with the welding torch 14, pendant 16, standard wire feeder 18, advanced wire feeder 20, and/or other device coupled to the power cables 24. In some embodiments, the communications circuitry 38 is configured to send and receive command and/or feedback signals over the welding power cables 24 used to supply the input power. In other embodiments, the communications circuitry 38 is configured to communicate wirelessly with another device.

Devices including the pendant 16, standard wire feeder 18, and advanced process wire feeder 20 receive input power through the input terminal 40 configured to couple with the first and second terminals 26, 28 of the power cables 24. In some embodiments, the first terminal 26 is configured to connect with the input terminal 40 and the second terminal 28 is configured to connect with the clamp 42 coupled to the workpiece 44. In some embodiments, the input terminal 40 has input connections with defined polarities configured to couple to the respective first and second terminals 26, 28 of the same polarities, and the clamp 42 couples to the pendant 16 or wire feeder 18. The advanced process wire feeder 20 is configured to couple to the first and second terminals 26, 28 with input terminals 40, and the clamp 42 is coupled to the advanced process wire feeder 20.

For some welding processes (e.g., TIG, GMAW), a shielding gas is utilized during welding. In some embodiments, as shown in the dashed lines, the welding power source 12 includes one or more gas control valves 46 configured to control a gas flow from a gas source 48. The gas control valves 46 may be controlled by the control circuitry 32. The welding power source 12 may be coupled to one or more gas sources 48 because some welding processes may utilize different shielding gases than others. In some embodiments, the welding power source 12 is configured to supply the gas with the input power via a combined input cable 50. In other embodiments, the gas control valves 46 and gas source 48 may be separate from the welding power source 12. For example, the gas control valves 46 may be disposed within the standard or advanced wire feeder 18, 20. The standard and advanced wire feeders 18, 20 shown in FIG. 1 are coupled to GMAW torches 52 configured to supply the gas and welding wire 54 to the welding application.

Figure 2:
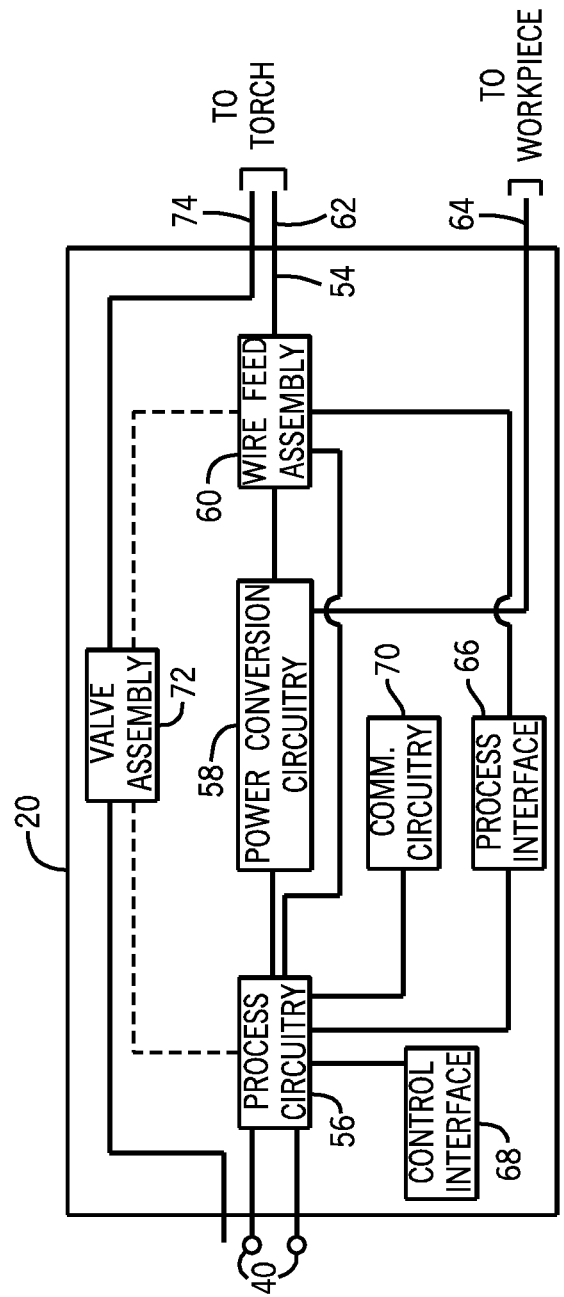
FIG. 2 is a block diagram of an embodiment of the advanced process wire feeder of FIG. 1.

FIG. 2 illustrates a block diagram an embodiment of the advanced process wire feeder 20 for converting input power to controlled waveform welding output. The advanced process wire feeder 20 receives the input power from the welding power source through input terminals 40 coupled to process circuitry 56. In some embodiments, the advanced process wire feeder 20 is operated remotely from the welding power source with long power cables. Process circuitry 56 may include circuitry such as relay circuitry, voltage and current sensing circuitry, power storage circuitry, and so forth, capable of sensing and controlling the input power received by the advanced process wire feeder 20. The process circuitry 56 transmits the input power to the power conversion circuitry 58.

Power conversion circuitry 58 is configured to convert the input power from the welding power source to welding output suitable for performing welding applications. Power conversion circuitry 58 may include circuit elements such as boost converters, buck converters, an internal bus, bus capacitor, voltage and current sensors, and so forth, capable of converting the input power to welding output. In some embodiments, input power received by the advanced process wire feeder 20 is a DC voltage between approximately 20V to 120V, approximately 40V to 100V, or approximately 60V to 80V. As used in reference to the input power, the term approximately may mean within 5 volts or within 10 percent of the desired voltage. The power conversion circuitry 58 may be configured to convert the input power to a controlled waveform welding output, such as a pulsed welding process or a short circuit welding process (e.g., regulated metal deposition (RMD™)). The power conversion circuitry 58 disposed within the advanced process wire feeder 20 supplies the controlled waveform welding output for the welding application without attenuation from the power cable between the welding power source and the advanced process wire feeder 20. This increases the response time and accuracy of the controlled waveform welding output supplied to the welding torch. Increasing the response time of the controlled waveform welding output may ensure that the desired welding output waveform is supplied to welding torch at specific times during the weld. For example, the RMD™ welding process utilizes a controlled waveform welding output having a current waveform that varies at specific points in time over a short circuit cycle. Increasing the response time of the controlled waveform welding output may also improve the timing of the waveform pulses to produce a desired weld.

In some embodiments, the power conversion circuitry 58 is configured to provide the welding output to the wire feed assembly 60. The wire feed assembly 60 supplies welding wire 54 to the welding torch for the welding operation. The wire feed assembly 60 includes elements such as a spool, wire feed drive, drive rolls, and wire feed control circuitry. The wire feed assembly 60 feeds welding wire 54 to the welding torch along a weld cable 62. The welding output may be supplied through the weld cable 62 coupled to the welding torch and/or the work cable 64 coupled to the workpiece.

Presently contemplated embodiments of the advanced process wire feeder 20 have a process operator interface 66 and a control operator interface 68 for control of parameters of the welding system. The process operator interface 66 is coupled to the process circuitry 56 for operator selection and adjustment of the welding process (e.g., pulsed, short-circuit, FCAW) through selection of the wire size, wire type, material, and gas parameters. The process operator interface 66 is coupled to the wire feed assembly 60 for control of supplying the welding wire 54 to the welding torch. The control operator interface 68 is coupled to the process circuitry 56 to adjust the voltage, amperage, wire feed speed, and arc length for a welding application. In some embodiments, the process operator interface 66 and the control operator interface 68 are separate interfaces, each with respective control circuitry. Alternatively, the process operator interface 66 and the control operator interface 68 may have common control circuitry and/or form a common control and process operator interface. The process operator interface 66 and/or the control operator interface 68 may include volatile or non-volatile memory, such as ROM, RAM, magnetic storage memory, optical storage memory, or a combination thereof. In addition, a variety of parameters may be stored in the memory along with code configured to provide a specific output for default parameters during operation.

The process interface 66 is configured to receive input such as wire material (e.g., steel, aluminum), wire type (e.g., solid, cored), wire diameter, gas type, and so forth. Upon receiving the input, the process circuitry 56 is configured to determine the controlled waveform welding output for the welding application. For example, the process circuitry 56 determines the pulse width, relative pulse amplitude, and/or wave shape for a controlled waveform welding output process based at least in part on the input received through the process interface 66. The wire feed assembly 60 may be configured to supply the welding wire 54 based on code or instructions stored in memory based on the received input. The wire feed assembly 60 is coupled to a process operator interface 66 and control operator interface 68 for controlling the welding wire 54 supplied for a welding operation. The wire feed assembly 60 adjusts parameters for supplying the welding wire 54 to the welding torch based at least in part on operator input received via the process operator interface 66 or the operator interface 68. The control operator interface 68 is configured to receive operator input for parameters such as the amperage, voltage, polarity, wire feed rate, arc length, process type (e.g., RMD™, pulsed welding), and so forth. In some embodiments, the control operator interface is configured to adjust the power of the controlled waveform welding output without affecting the shape of the controlled waveform welding output. The process circuitry 56 adjusts the power conversion circuitry 58 and wire feed assembly 60 based at least in part on operator input received via the control operator interface 68. In some embodiments, communications circuitry 70 coupled to the process circuitry 56 is configured to send and receive command and/or feedback signals over the power cable used to provide the input power. The communications circuitry 70 enables the process operator interface 66 and/or control operator 68 to control the welding power source. For example, the process operator interface 66 and/or control operator 68 may be configured to control the amperage, voltage, or other parameters of the input power supplied by the welding power source. In some embodiments, the process circuitry 56 controls the welding power source remote from the welding power source without being restricted to parameters set on the operator interface 34 (FIG. 1). That is, the process circuitry 56 and communications circuitry 70 enables an operator to control the welding power source remotely through the advanced process wire feeder 20 with equal control priority to the operator interface 34 of the welding power source.

Some embodiments of the advanced process wire feeder 20 include a valve assembly 72 for providing gas to the welding torch along a gas line 74. The valve assembly 72 may be controlled by the process circuitry 56 and/or the wire feed assembly 60 as shown by the dashed control lines. For example, the valve assembly 72 may be configured to supply gas to the welding torch prior to and after a welding application. In some embodiments, the valve assembly 72 is configured to purge the gas line 74 upon receiving a purge command from the process operator interface 66 or the control operator interface 68.

Figure 3:
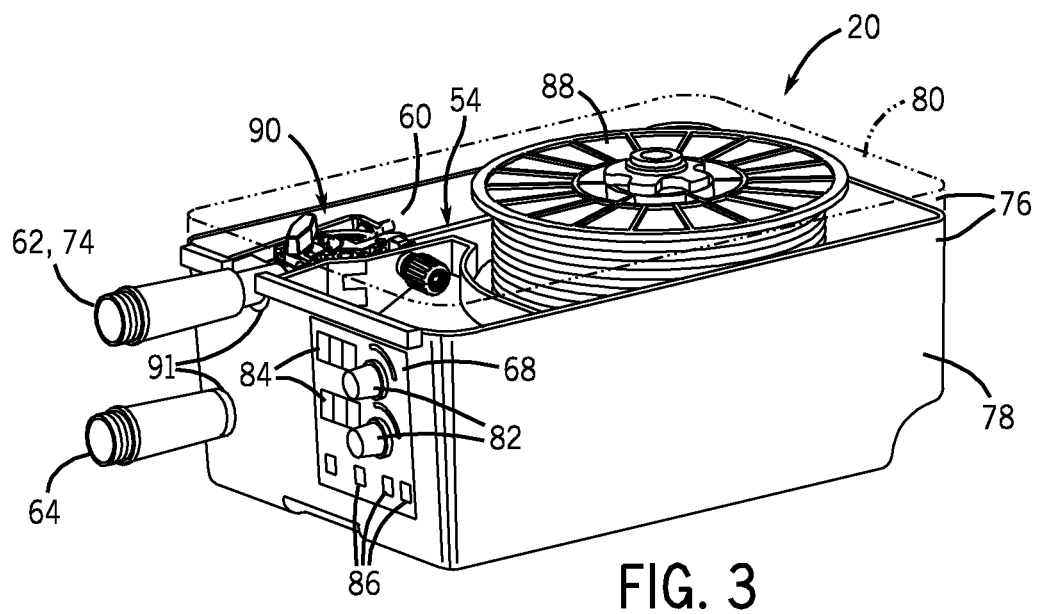
FIG. 3 is a front perspective view of an advanced process wire feeder in accordance with aspects of the present disclosure.

FIG. 3 illustrates a front perspective view of an embodiment of the advanced process wire feeder 20 disposed in an enclosure 76 having the process operator interface 66 separate from the control operator interface 68. In some embodiments, the advanced process wire feeder 20 is disposed in an enclosure 76 having an enclosure base 78 and enclosure cover 80 to shield the wire feed assembly 60 from the operating environment when the enclosure 76 is closed. The enclosure 76 may be substantially portable (e.g., suitcase feeder) and configured for manual operator transport to a welding application remote from the welding power source. The enclosure cover 80 is shown in dashed lines for clarity to illustrate an embodiment of the wire feed assembly 60 disposed within the enclosure.

The control operator interface 68 may be disposed outside the enclosure 76 as illustrated in FIG. 3. The control operator interface 68 may include one or more dials 82, one or more displays 84, and one or more buttons 86. In some embodiments, the dials 82 may be configured to adjust voltage and/or amperage of the input power or welding output, wire speed, or arc length, or combinations thereof. One or more buttons 86 may enable the operator to select process types, operator preferences, or process parameters previously stored in memory, or combinations thereof. The control operator interface 68 may enable operator selection of process parameters stored in memory, such as previously selected amperage and wire speed for the selected controlled waveform welding process. The displays 84 may be configured to display adjusted process parameters and/or selected process type (e.g., RMD™, pulsed welding, FCAW, MIG). In some embodiments, the one or more displays 84, lights, or other devices may be configured to provide an operator-perceptible notification to notify the operator if the polarities of the coupled power cables correspond to the respective input terminals 40.

Embodiments of the advanced process wire feeder 20 include one or more spools 88 of welding wire 54 disposed within the enclosure 76 to supply the wire feed drive 90. The welding wire 54 is pulled through the wire feed drive 90 and an output terminal 91 to the weld cable 62. In some embodiments, the gas line 74 may be within the weld cable 62 as illustrated. A work cable 64 is coupled to the output terminal 91.

Figure 4:
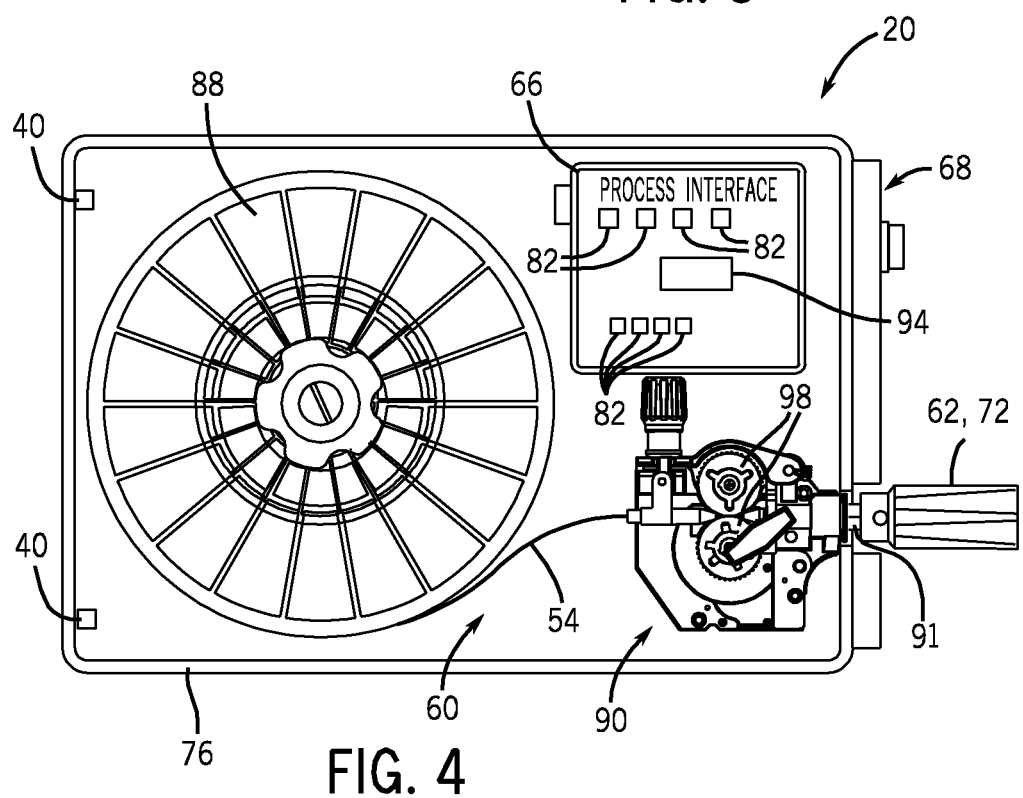
FIG. 4 is a top view of an embodiment of the advanced process wire feeder of FIG. 3.

FIG. 4 illustrates a top view of an embodiment of the advanced process wire feeder 20 with the process operator interface 66 disposed within the enclosure 76. The process operator interface 66 may include one or more buttons 92 and one or more indicators 94 to receive and display wire and material parameters. In some embodiments, the process operator interface 66 may be configured to receive gas parameters. The one or more buttons 92 of the process operator interface 66 may be configured to receive input such as wire material (e.g., steel, aluminum), wire type (e.g., solid, cored), wire diameter, and gas type. In some embodiments, the wire and/or gas parameters may be adjusted less frequently than the control parameters selected through the control operator interface 68. For example, process operator interface 66 may be disposed within the enclosure that is normally closed during welding. As another example, the process operator interface 66 may be adjusted primarily when changing the spool 88 of welding wire 54. Indicators 94 may include displays, lights, or other devices configured to provide an operator-perceptible notification indicating the selected wire and/or gas parameters. Two or more drive wheels 98 of the wire feed drive 90 are configured to direct the welding wire 54 through the output terminal 91 along the weld cable 62.

Figure 5:
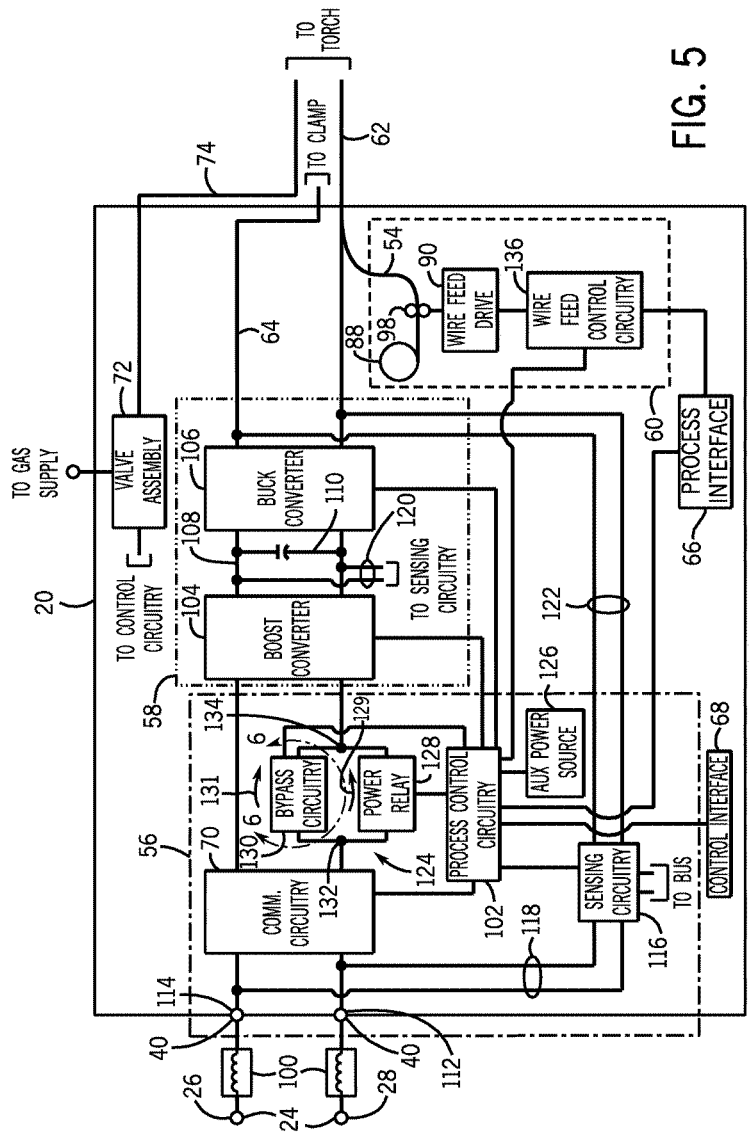
FIG. 5 is a block diagram of an embodiment of the advanced process wire feeder employing power conversion circuitry, relay circuitry, sensing circuitry, and a wire feed assembly in accordance with aspects of the present disclosure.

FIG. 5 illustrates a block diagram of an embodiment of the advanced process wire feeder 20 having process circuitry 56, power conversion circuitry 58, and a wire feed assembly 60. Embodiments of the advanced process wire feeder 20 may be coupled to long power cables 24 having an inductance 100. As may be appreciated, the power cables 24 may be conventional power cables 24. As discussed above, the advanced process wire feeder 20 may be located remotely from the welding power source. For example, the advanced process wire feeder 20 may be disposed between approximately 30 to 200 feet, approximately 50 to 150 feet, or approximately 100 to 150 feet from the welding power source 12. In some embodiments, the remotely located advanced process wire feeder may be in a different building, structure, or room than the welding power source 12. The inductance 100 may vary during use as the power cables 24 are coiled, extended, and moved.

The power conversion circuitry 58 is configured to receive the input power from the power cables 24 and convert the input power to welding output. The power conversion circuitry may convert the input power to welding output without regard to the inductance 100 of the power cables 24. Process control circuitry 102 controls the power conversion circuitry 58 based at least in part on parameters received from the process operator interface 66 and/or control operator interface 68. The process control circuitry 102 controls a boost converter 104 and a buck converter 106 to convert the input power to welding output. An internal bus 108 may be disposed between the boost converter 104 and buck converter 106. Only one boost converter 104 and buck converter 106 are discussed herein for clarity, however, other embodiments of the power conversion circuitry 58 may have one or more boost converters 104 and/or one or more buck converters 106. The boost converter 104 and buck converter 106 are configured to convert the input power to welding output suitable for controlled waveform welding processes, such as for RMD™ and pulse welding processes.

The boost converter 104 receives DC voltage from the input terminals 40 and steps-up, or increases, the DC voltage of the bus power supplied to the buck converter 106. As may be appreciated, the boost converter 104 converts the DC input power from the welding power source to a substantially pulsed stepped-up voltage DC bus power using a switch (e.g., FET) to open and close a boost circuit. The stepped-up voltage of the DC bus power is based at least upon the duty cycle of the switch. Varying the duty cycle of the switch affects the timing of when the stepped-up voltage DC bus power is supplied to the internal bus 108. By controlling the switch of the boost converter 104, the process control circuitry 102 may adjust the timing, voltage, and amperage of the DC bus power.

The buck converter 106 receives the stepped-up voltage DC bus power and steps-down, or decreases, the DC voltage to control the amperage of the welding output. As may be appreciated, the buck converter 106 converts the pulsed, stepped-up voltage DC bus power to a pulsed, stepped-down voltage DC welding output using a switch (e.g., FET) to open and close a buck circuit. As with the boost converter 104, varying the duty cycle of the switch of the buck converter 106 affects the timing of when the stepped-down voltage DC welding output is supplied to the welding torch. In some embodiments, multiple buck converters 106 may be coupled to the internal bus 108 in parallel and controlled separately to affect the timing and amplitude of changes (e.g., pulses) to the welding output. By controlling the switch of the buck converter 106, the process control circuitry 102 may adjust the timing, voltage, and amperage of the DC welding output. The control circuitry 102 is configured to control the switches of the boost and buck converters 104, 106 to dynamically adjust the voltage and/or amperage of the DC welding output supplied to the torch based on the operator selected welding process (e.g., RMD™, pulsed welding, FCAW, MIG). In some embodiments, the process control circuitry 102 is configured to control the boost converter 104 and/or buck converter 106 based on sensed parameters of the input power, bus power, or welding output, or combinations thereof. For example, the control circuitry 102 may control the boost converter 104 based on sensed parameters of the welding output to control the voltage across the internal bus 108.

In some embodiments, a power storage circuit (e.g., bus capacitor 110) may be disposed on the internal bus 108. The bus capacitor 110 may partially protect the boost converter 104 and/or buck converter 106 from a difference between the input power into the power conversion circuitry 58 and the welding output from the power conversion circuitry 58 at any time. As discussed above, the bus power converted by the boost converter 104 is directed to the internal bus 108, then the buck converter 106. The bus capacitor 110 may be configured to store the bus power until it is received by the buck converter 106. Storing and discharging relatively large amounts of power in the bus capacitor 110 may heat the bus capacitor. The voltage difference between the bus power supplied by the boost converter 104 and the bus power removed by the buck converter 106 to convert to welding output may be measured as voltage ripple. Decreasing the magnitude of the voltage ripple may improve the weld quality and/or maintain the temperature of the bus capacitor 110. The size and capacitance of the bus capacitor 110 may be based on the magnitude of the voltage ripple, which is affected at least in part on control of the boost converter 104 and the buck converter 106. The bus capacitor 110 may partially attenuate and/or delay the voltage ripple.

In some embodiments, the process control circuitry 102 is configured to control the duty cycles of the boost converter 104 and the buck converter 106 to reduce the voltage ripple of the bus capacitor 110 based at least in part on sensed parameters of the input power and welding output. The current and voltage of the input power are sensed at the first and second connections 112, 114 by sensing circuitry 116 through input sensors 118. The sensing circuitry 116 senses the current and voltage at the internal bus 108 across the bus capacitor 110 through bus sensors 120, and senses the current and voltage of the welding output through output sensors 122. The process control circuitry 102 may drive the boost converter 104 and the buck converter 106 based at least in part on sensed parameters (e.g., voltage, current) of the welding output, the input power, or the bus power, or combinations thereof. For example, the sensing circuitry 116 may sense the voltage and current of the welding output with welding output sensors 122 and sense the voltage of the input power and bus power with input sensors 118 and bus sensors 120. In some embodiments, the process control circuitry 102 is configured to determine the product (i.e., power) of the welding output current and voltage and loss of the power conversion circuitry 58, to determine the sum of the loss and the product, to divide the sum by the input voltage to determine the desired bus current, and to drive the boost converter 104 to control the bus current. The boost converter 104 may control the bus current to the desired bus current to substantially match the bus power into the internal bus 108 with the welding output removed from the internal bus 108. The inductance 100 of the power cables 24 delays the current flow into the internal bus 108 from the welding power source. Controlling the boost converter 104 based on the input sensors 118 and/or bus sensors 120 rather than the current and voltage of the input power at the welding power source reduces the voltage ripple on the bus capacitor 110. Controlling the boost converter 104 based on the input sensors 118 and/or bus sensors 120 reduces or eliminates the effects of the inductance 100 on the welding output. In some embodiments, the process control circuitry 102 is configured to control the boost and buck converters 104, 106 to reduce the voltage ripple on the internal 108 bus at least while the buck converter 106 is converting the bus power to a welding output suitable for a controlled waveform welding process (e.g., pulsed welding, short circuit welding).

The process control circuitry 102 may be configured to reduce the voltage ripple by adjusting the timing of the control signals for the duty cycle of switches within the boost and buck converters 104, 106. By adjusting the timing of the control signals, the process control circuitry 102 may be configured to generally align pulses (e.g., phases) of the welding output voltage and current with the pulses of the input current of the input power. The process control circuitry 102 may adjust the relative timing (e.g., phase shift, advance in time, delay in time) signal pulses from the boost converter 104 and/or buck converter 106 to reduce the voltage ripple. Reducing the voltage ripple on the internal bus 108 may enable the bus capacitor 110 to be smaller, lighter, cooler, more efficient, cheaper, or combinations thereof. The process control circuitry 102 may be configured to tune the voltage ripple to a minimum value for any inductance 100 of the power cables 24. In this way, the inductance 100 may change during operation of the welding system or between welding operations without affecting the voltage ripple on the internal bus 108 and/or welding output from the buck converter 106.

The input power is received from the welding power source along the power cable 24 coupled to the input terminals 40. In some embodiments, the input terminals 40 have the first input connection 112 and the second input connection 114 with respective defined polarities. As discussed above, the first and second terminals 26, 28 have a positive and negative polarity, thus the input power is polarized. In some embodiments, sensing circuitry 116 is configured to detect the polarity of the polarized input power supplied to the first and second input connections 112, 114 using the input sensors 118. The sensing circuitry 116 may be configured to detect a mismatch between the polarities of the first and second terminals 26, 28 and defined polarities of the first and second input connections 112, 114. The process control circuitry 102 coupled to the sensing circuitry 116 may be configured to provide the polarized input power to the power conversion circuitry 58 only if the detected input power polarity corresponds to the defined polarities of the first and second input connections 112, 114. The advanced process wire feeder 20 may be configured to supply a polarized welding output for a particular welding application. Switching the polarity of the first and second terminals 26, 28 so that the terminals 26, 28 do not correspond to the first and second input connections 112, 114 may switch the polarity of the power cable 62 and work cable 64 from DCEN to DCEP, or from DCEP to DCEN.

In some embodiments, the advanced process wire feeder 20 is configured to notify the operator of the polarity and/or switch the polarity of the input power automatically. For example, the process operator interface 66 and/or control operator interface 68 may be configured to provide an operator-perceptible notification if the polarity of the polarized input power does not correspond to the defined polarities of the first and second input connections 112, 114. The communications circuitry may be configured to send and receive command and/or feedback signals over the power cable to the welding power source. The communications circuitry sends a signal indicative of a mismatch between the polarities of the input connections so that the welding power source may provide an operator-perceptible notification of the polarity and/or reverse the polarity of the input power. In some embodiments, polarity reversing circuitry 36 (FIG. 1) of the welding power source reverses the polarity of the polarized input power based upon the signal such that the polarity of the polarized input power corresponds to the defined polarities of the first and second input connections 112, 114.

The sensing circuitry 116 is also configured to measure the current and/or voltage of the internal bus 108 with bus sensors 120 and to measure the current and/or voltage of the welding output with welding output sensors 122. The process control circuitry 102 monitors the input sensors 118, bus sensors 120, and welding output sensors 122 through the sensing circuitry 116. Upon detection of a change of the polarized input power and/or the welding output to a value outside of a threshold range, the process control circuitry 102 may open relay circuitry 124 to interrupt provision of the polarized input power to the operational components of the welding wire feeder 20. The operational components may include, but are not limited to, the power conversion circuitry 58, the welding wire feed drive 90, or the wire feed control circuitry, or any combination thereof. The threshold range has a maximum threshold value (e.g., approximately 80V, 100V, 120V, or more) and a minimum threshold value (e.g., approximately 20V, 25V, or 30V). Operating the power conversion circuitry when the polarized input power and/or the welding output are within the threshold range may increase the stability or consistency of the conversion. For example, a short circuit downstream of the relay circuitry 124 may cause a voltage decline across the internal bus 108 and/or voltage decline of the welding output. Opening the relay circuitry 124 may protect at least the relay circuitry 124 from excess input power due to the short circuit downstream. The relay circuitry 124 may include circuit elements such as a latching relay, non-latching relay, solid state switches, and so forth. The relay circuitry 124 is configured to close to provide input power and to open to interrupt input power to the power conversion circuitry 58. In some embodiments, power storage circuitry may provide power to open the relay circuitry 124 and interrupt input power. The power storage circuitry may include an auxiliary power source 126 and/or the bus capacitor 110 on the internal bus 108.

Presently contemplated embodiments of the relay circuitry 124 include a power relay 128 and bypass circuitry 130 coupled in parallel at first and second relay junctions 132, 134. The power relay 128 may be a latching relay or a non-latching relay configured to carry high amperage DC along a first current path 129 when closed. A latching relay may be smaller and lighter than a non-latching relay with the same current capacity. In some embodiments, the power relay 128 may be the Relay Type 753 manufactured by Gruner of Wehingen, Germany. The bypass circuitry 130 may include, but is not limited to, a drive circuit, a voltage clamping device (e.g., metal oxide resistor), and one or more switches responsive to drive signals from the drive circuit. The one or more switches are configured to carry current along a second current path 131 when closed. The voltage clamping device may be configured to clamp the voltage across the first and second relay junctions 132, 134 in response to a voltage spike (e.g., rapid increase or decrease) across the relay circuitry 124. The voltage spike may cause a large current to otherwise flow along the first and/or second current path 129, 131. The voltage clamping device may be configured to dissipate some of the energy stored in the inductance 100 of the power cables 24. In some embodiments, the bypass circuitry 130 may include at least a pair of switches to protect the drive circuit if the polarities of the first and second terminals 26, 28 do not correspond to the respective defined polarities of the coupled first and second terminals 112, 114. The bypass circuitry 130 may also include multiple solid state switches (e.g., transistors) coupled in parallel to the power relay 128 to provide a desired current carrying capacity, such as the high amperage DC input power. The drive circuit may be the process control circuitry 102 or a separate circuit controlled by the process control circuitry 102.

The process control circuitry 102 is configured to apply signals to the power relay 128 to open and close the power relay 128, and to apply signals to the bypass circuitry 130 to open and close the bypass circuitry 130 in coordination with opening and closing the power relay 128. In some embodiments, the signals to open and close the power relay 128 and to open and close the bypass circuitry 130 are applied substantially simultaneously. The bypass circuitry 130 may be configured to carry a fraction of the input power along the second current path 131 to the power conversion circuitry 58 for a short time to reduce the remainder of the input power carried along the first current path 129 through the power relay 128 for that short time. When closed, the switches of the bypass circuitry 130 are configured to reduce the current across the power relay 128 to enable the power relay 128 to open or close without arcing and/or using magnetic blow-outs. After the process control circuitry 102 signals the power relay 128 to open or close, the process control circuitry 102 signals the switches of the bypass circuitry 130 to open to interrupt the fraction of the input power along the second current path 131. The switches of the bypass circuitry 130 may be configured to carry the input power along the second current path 131 for the short time while the power relay 128 is opened or closed.

The power relay 128 is closed to provide input power to the power conversion circuitry 58 during welding. In some embodiments, the process control circuitry 102 coupled to the sensing circuitry 116 is configured to monitor the voltage of the input power and the voltage across the internal bus 108. The control circuitry 102 is configured to open the power relay 128 based at least in part on a decline of either the input voltage or the voltage across the internal bus 108, which may indicate a short circuit downstream of the relay circuitry 124. The process control circuitry 102 may actuate the power relay 130 with power stored in a power storage circuit, such as the auxiliary power supply 126 or the bus capacitor 110. For example, the process control circuitry 102 may discharge the power storage circuit to power a coil to open or close the power relay 128

In some embodiments, a power storage circuit may be charged before the welding power source provides input power suitable for conversion to welding output. The power storage circuit (e.g., bus capacitor 110) on the internal bus 108, may be charged by the received input current at an initial level. In some embodiments, the process control circuitry 102 transmits a precharge signal to the welding power source to reduce the input current of the input power to the initial level. The sensing circuitry 116 may sense the charge of the power storage circuit with the bus sensors 120. In some embodiments, the process control circuitry 102 may initiate a signal to the welding power source to increase the input current to a greater level based upon a comparison between the input power voltage and the voltage across the internal bus 108. In some embodiments, the process control signal receives the input current at the greater level after the first current path 129 is closed and the second current path 131 is opened. Receiving input current at an initial level first, and then receiving input current at a greater level enables a staged initialization of the advanced process wire feeder 20 to reduce the inrush current and input power drawn by the process control circuitry 102 and/or the power conversion circuitry 58. For example, the process control circuitry 102 may initiate the signal to the welding power source when the bus voltage is approximately 50%, 75%, or 100% of the input power voltage. In some embodiments, the signal is sent to the welding power source via the communications circuitry 70 and power cable 24.

The bus capacitor 110 between the boost converter 104 and the buck converter 106 may perform several functions within the advanced process wire feeder 20. The bus capacitor 110 may store power to open or close the relay circuitry 124 to interrupt the input power flow to the operational components (e.g., power conversion circuitry 58, wire feed drive 90, wire feed control circuitry 136). The process control circuitry 102 may open or close the relay circuitry 124 based on the voltage of the bus capacitor 110 and/or the input connections 112, 114. The process control circuitry 102 may also send the signal to the welding power source based at least in part on the sensed voltage of the bus capacitor 110 and/or input connections 112, 114.

In some embodiments, the bypass circuitry 130 is configured to prevent the power relay 128 from closing if there is a short circuit downstream of the relay circuitry 124. The process control circuitry 102 may test the advanced process feeder 20 by closing the second current path 131 to determine if the voltage of the internal bus 108 may increase. In the case of a short circuit downstream of the relay circuitry 124, the voltage of the internal bus 108 would not increase. When the process control circuitry 102 determines that the voltage of the internal bus 108 may increase, the process control circuitry 102 may close the power relay 128 to enable input power to flow to the power conversion circuitry 58. Testing the advanced process wire feeder 20 for a short circuit downstream of the relay circuitry 124 enables the power relay 128 to remain open in the event of a short circuit.

The wire feed assembly 60 is controlled by wire feed control circuitry 136 coupled to the wire feed drive 90. The wire feed control circuitry 136 may be coupled to the process operator interface 66, the control operator interface 68, and the process control circuitry 102. The wire feed control circuitry 136 controls the wire feed drive 90 to supply the welding wire 54 to the weld cable 62 based at least in part on parameters received via the process operator interface 66 and control operator interface 68. As discussed above, the process operator interface 66 may be configured to receive inputs for gas parameters. The valve assembly 72 coupled to the gas line 74 is configured to be controlled by the process control circuitry 102 and/or the wire feed control circuitry 136.

Figure 6:
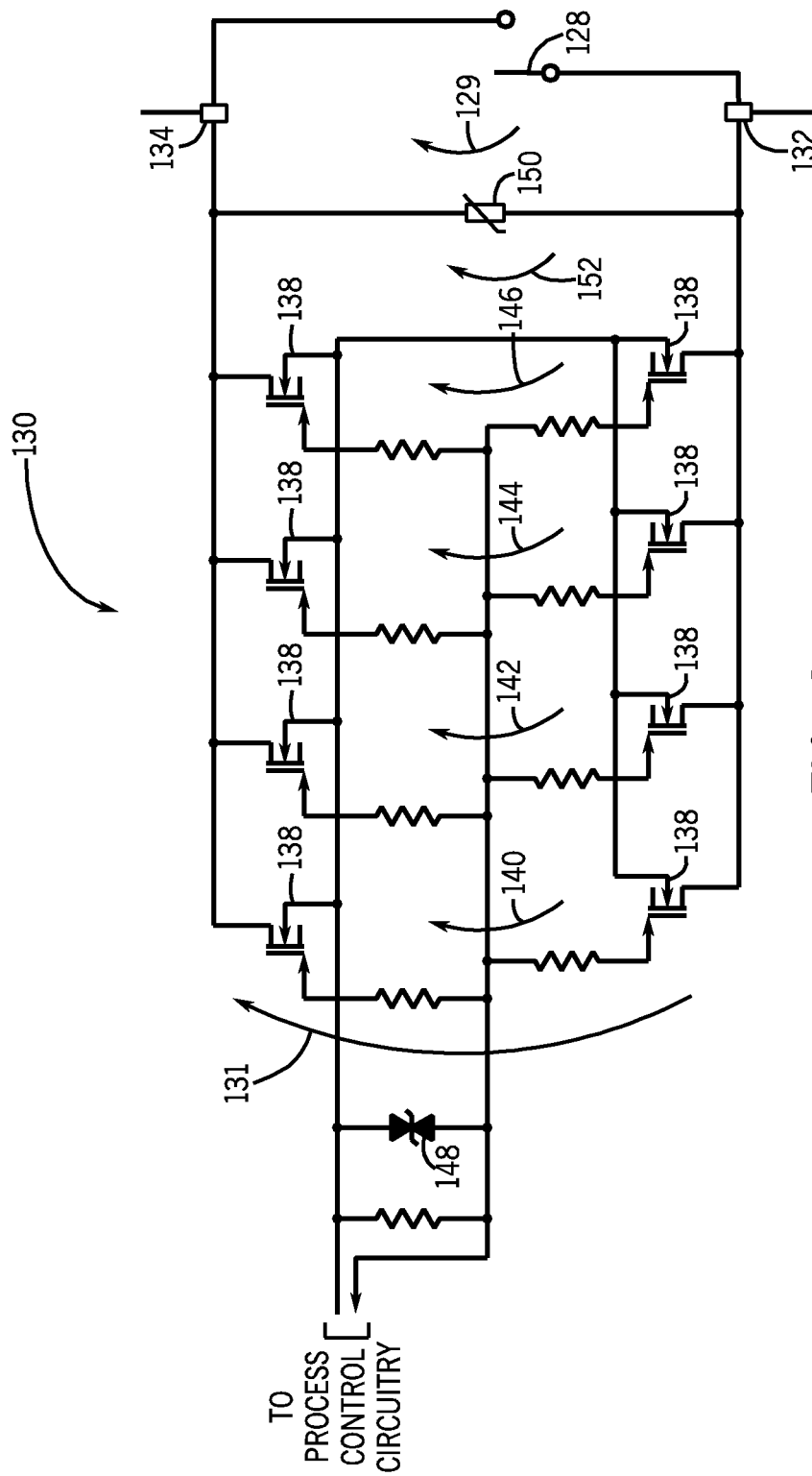
FIG. 6 is a schematic diagram of an embodiment of the relay circuitry of FIG. 5.

FIG. 6 illustrates a schematic diagram of an embodiment of the bypass circuitry 130 of FIG. 5 along line 6-6. As described above, the bypass circuitry 130 is coupled in parallel with the power relay 128 at the first and second relay junctions 132, 134. The bypass circuitry 130 includes one or more switches 138, such as metal-oxide-semiconductor field-effect transistors (MOSFETs), coupled in parallel to the power relay 128. In some embodiments, the solid state switches may be arranged in an anti-series parallel configuration. The power relay 128 and the bypass circuitry 130 are controlled by the process control circuitry to open and close at substantially the same time to reduce arcing across the power relay 128. Closing the power relay 128 enables current to flow along the first current path 129 and closing the switches 138 enables current to flow along the second current path 131. The second current path 131 may include a number of branches 140, 142, 144, and 146 between parallel switches. Changing the number of branches affects the current carrying capacity along the second current path 131, thus affecting the current along the first path 129 when the power relay 128 is actuated. Reducing the current along the first path 129 when actuating the power relay 128 reduces arcing between contacts of the power relay. The process control circuitry is configured to control the one or more switches 138 through a gate 148 or other control switch to open and close the one or more switches 138 simultaneously or sequentially. The one or more switches 138 are configured to be open unless controlled by the process control circuitry to close.

Upon receiving control signals from the process control circuitry, the one or more switches 138 are configured to close, opening the second current path 131. While the one or more switches 138 are closed, the process control circuitry controls the power relay 128 to actuate open or closed with a reduced current along the first current path 129 due to the current along the second current path 131. After the power relay 128 is actuated open or closed, the process control circuitry opens the one or more switches 138 to open the second current path 131. The control signals from controlling the one or more switches 138 and the power relay 128 may be pulses that open and close the first and second current paths 129, 131 substantially simultaneously. That is, the power relay 128 may open and close the first and second current paths 129, 131 in approximately 5 to 50 milliseconds, 10 to 40 milliseconds, or approximately 20 to 30 milliseconds.

The bypass circuitry 130 includes a voltage clamping device 150 (e.g., (e.g., metal oxide resistor, varistor) to protect the one or more switches 138 and power relay 128 from over-voltages. Upon opening the power relay 128, the voltage between the first and second relay junctions 132, 134 may increase as the bus capacitor, power cables, and/or auxiliary power source, or other circuitry releases stored charge. The voltage clamping device 150 is configured to have greater electrical resistance at higher voltages than at lower voltages. The voltage clamping device 150 carries more current along the third current path 152 as the voltage between the first and second relay junctions 132, 134 increases to maintain the current along the first and second current paths 129, 131 below threshold levels.

Figure 7:
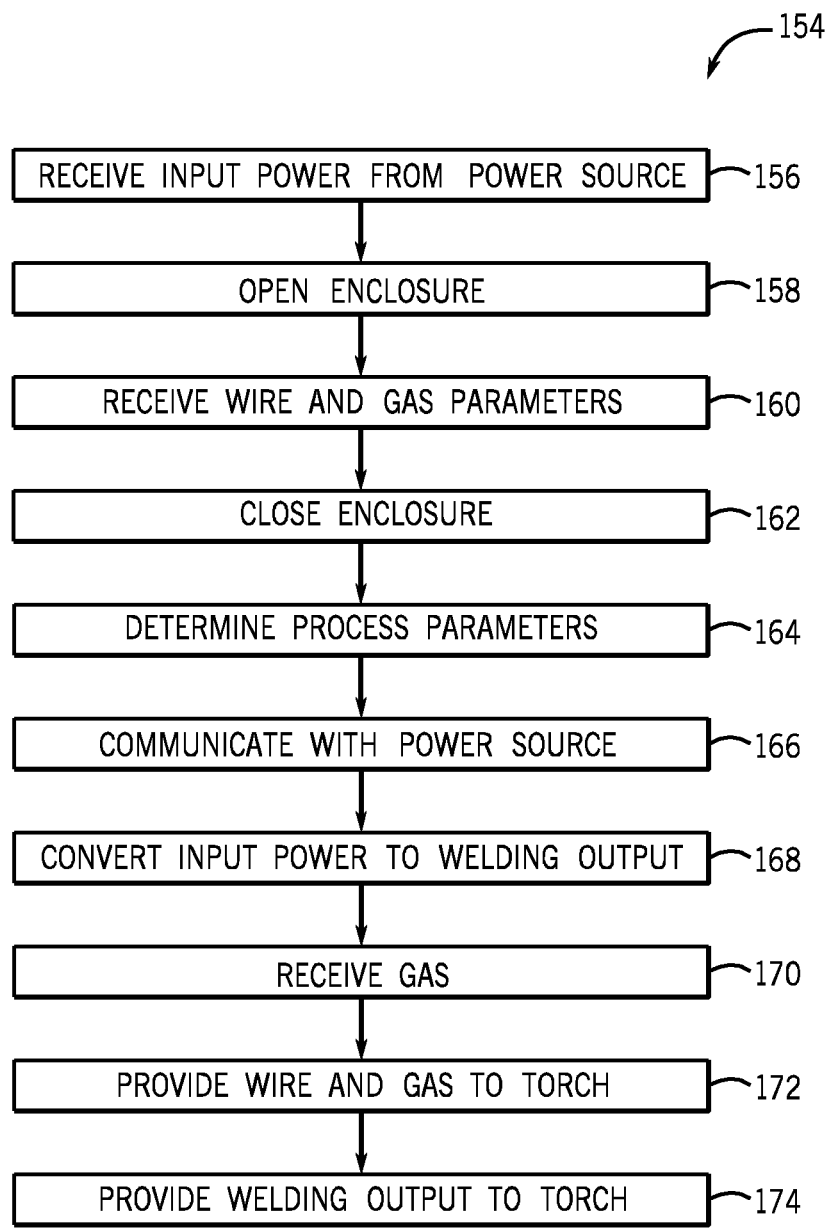
FIG. 7 is a flow chart of an embodiment of a process for producing controlled waveform output using an advanced process wire feeder.

The advanced process wire feeder of FIG. 5 may be utilized according to multiple methods as illustrated in FIGS. 7-10. Some embodiments of the advanced process wire feeder may be utilized with all of the illustrated embodiments of FIGS. 7-10. Other embodiments of the advanced process wire feeder may be utilized with only some of the illustrated embodiments of FIGS. 7-10. FIG. 7 illustrates a method 154 of converting input power to controlled waveform welding output within an advanced process wire feeder. The first step 156 of the method is to receive input power from the welding power source. In some embodiments, the input power may be a polarized DC input power of approximately 80V. The input power may not be suitable for a controlled waveform welding process if it was directly supplied to the welding torch. In step 158, an operator may open the enclosure of the advanced process wire feeder. The operator may open the enclosure to install or change the welding wire spool or to adjust parameters relating to the welding wire and gas supply. At step 160, the process operator interface within the enclosure receives the wire and/or gas parameter before the enclosure is closed at step 162. At step 164, the process control circuitry determines the process parameters. The process parameters include a controlled waveform output, the amperage, the feed rate of the welding wire, and so forth. The process parameters may be determined based on the parameters received through the process operator interface. In some embodiments, the control circuitry automatically determines the process parameters for a controlled waveform welding output based on code and/or instructions stored in memory without direct selection of the process type by the operator. The advanced process wire feeder may communicate with the welding power source at step 166 to adjust the input power based at least in part on the received process and/or wire parameters. In some embodiments, step 166 may occur at any time during operation of the advanced process wire feeder. At block 168, the advanced process wire feeder converts the input power to welding output. The welding output may be a controlled waveform welding output suitable for a short circuit or pulsed welding process. The welding output converted by the power conversion circuitry within the advanced process wire feeder is not attenuated by inductance of the power cable coupled to the welding power source. The advanced process wire feeder receives shielding gas at step 170. The shielding gas may be supplied through the welding power source or a separate gas supply. At step 172, the advanced process wire feeder provides the wire and gas to the welding torch based at least in part on the input received at steps 160 and 164. At step 174, the welding output is provided to the welding torch, based at least in part on the input received at step 164. The welding output may be suitable for a controlled waveform welding process because of the relatively short distance and low inductance between the power conversion circuitry and the welding torch.

Figure 8:
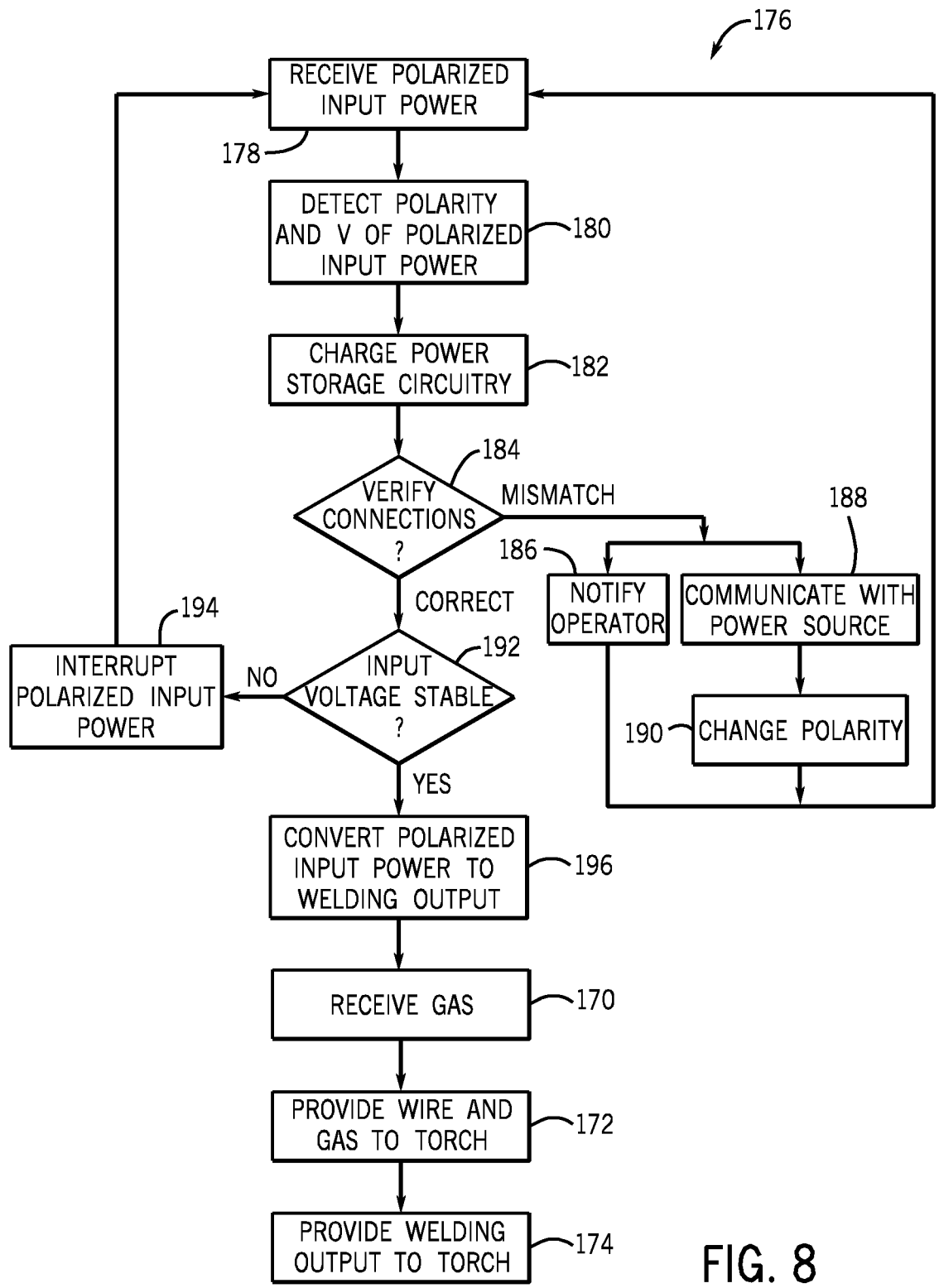
FIG. 8 is a flow chart of an embodiment of a process for sensing polarity of input power supplied to an advanced process wire feeder.

FIG. 8 illustrates a method 176 of sensing the polarity of the input power received by the advanced process wire feeder. At step 178, the advanced process wire feeder receives polarized input power from the welding power source. The polarized input power is supplied along first and second terminals of the power cable. The input power is received at two input connections, each with a defined polarity. At block 180, sensing circuitry detects the polarity and voltage of the polarized input power with input sensors at the first and second input connections. In some embodiments, at block 182, the received input power may charge power storage circuitry, such as an auxiliary power source and/or a bus capacitor.

Upon detecting the polarity of the input power at step 180, the sensing circuitry verifies at node 184 whether the first and second terminals correspond to the defined polarities of the input connections. If there is a mismatch between the polarities, process control circuitry within the advanced process wire feeder may notify the operator with an operator-perceptible notification of the mismatched polarity through the process operator interface, the control operator interface, and/or the welding power source. Alternatively, at block 188 the process control circuitry may communicate with the welding power source to direct the welding power source to change the polarity of the input power as shown at block 190. If the polarity of the input power matches the polarity of the defined polarity connections, then the process control circuitry determines at node 192 whether the input power and input voltage is substantially stable. If the input voltage is stable, the input power is supplied to the power conversion circuitry. The process control circuitry may periodically sense and determine whether the input voltage is stable at node 192 during the welding process. If the input voltage is not stable, the process control circuitry may interrupt the polarized input power supply to the power conversion circuitry. The process control circuitry may interrupt the polarized input power by opening a power relay upstream of the power conversion circuitry and/or communicating with the welding power source to cease supplying the advanced process wire feeder with input power. If the input power is interrupted, the method 176 may be repeated from step 178 when polarized input power is received.

If the input voltage is stable, the input power is supplied to the power conversion circuitry to convert the polarized input power to welding output at block 196. The welding output may be a controlled waveform welding output suitable for a short circuit or pulsed welding process. Additionally, the welding output may be suitable for a FCAW process or GMAW welding process. The welding output converted by the power conversion circuitry within the advanced process wire feeder 20 is not attenuated by inductance of the power cable coupled to the welding power source. The advanced process wire feeder receives shielding gas at step 170. The shielding gas may be supplied through the welding power source or a separate gas supply. At step 172, the advanced process wire feeder provides the wire and gas to the welding torch. At step 174, the welding output is provided to the welding torch. The welding output provided may be suitable for a controlled waveform welding process because of the relatively short distance and low inductance between the power conversion circuitry and the welding torch.

Figure 9A:
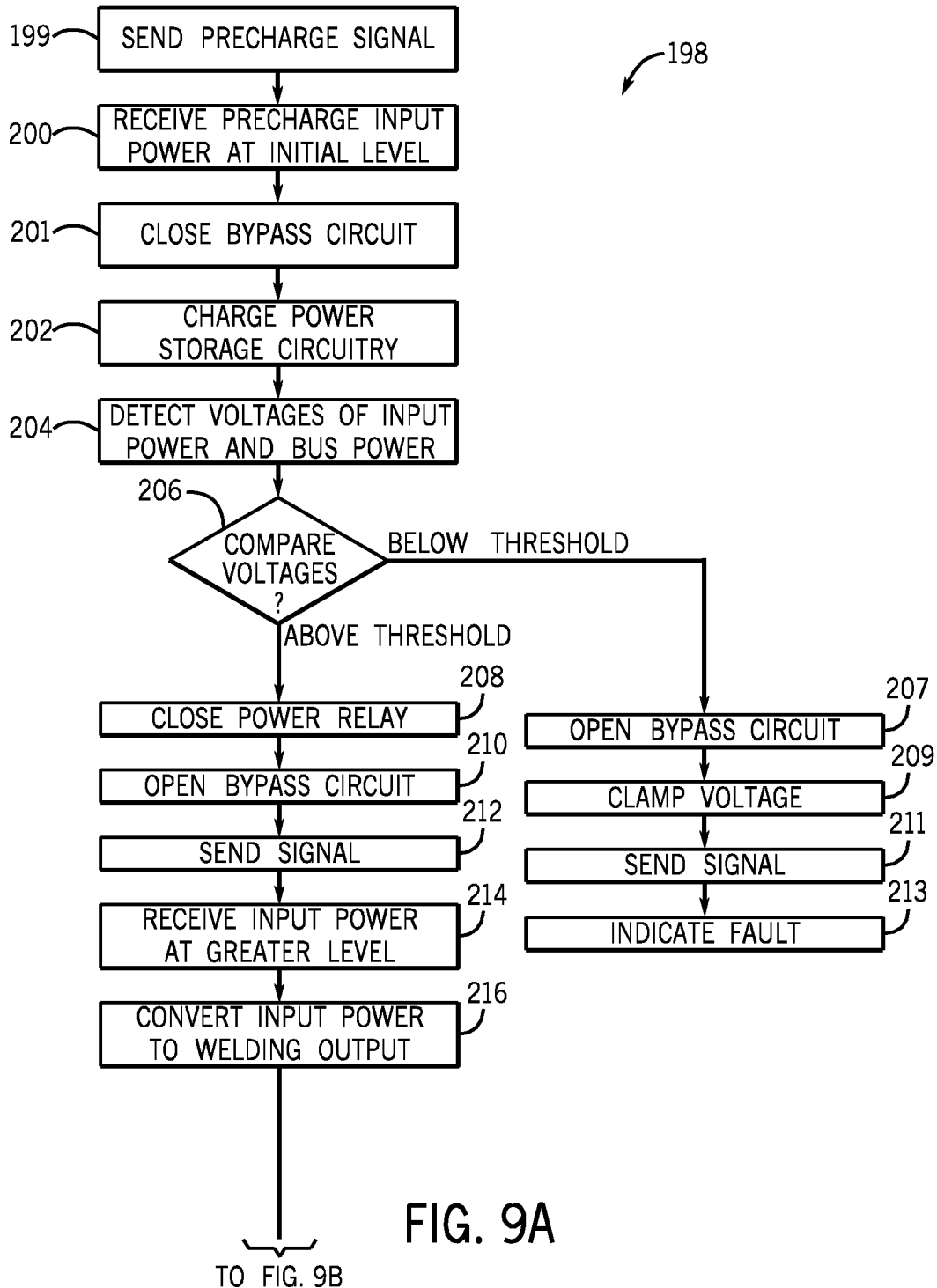
FIG. 9A is a first part of a flow chart of an embodiment of a process for actuating relay circuitry of an advanced process wire feeder.

FIG. 9A illustrates a first part of a method 198 of precharging circuit elements of the advanced process wire feeder and using bypass circuitry in parallel with the power relay. The advanced process wire feeder sends a precharge signal to the welding power source at step 199 when the advanced process wire feeder is electrically coupled to the welding power source. The precharge signal directs the welding power source to limit the current of the precharge input power to an initial level. At step 200, the advanced process wire feeder receives the input power at the initial level. At step 201, the process control circuitry sends a control signal to the bypass circuit to close the second current path to transmit the input power at the initial level to the power storage circuitry (e.g., bus capacitor on the internal bus). The input power at the initial level charges power storage circuitry (e.g., bus capacitor) at step 202. The sensing circuitry detects the voltages of the input power and bus power at step 204. The voltage of the bus power is a measure of the power stored in the bus capacitor. At node 206, the process control circuitry compares the voltages of the input power and the bus power. In some embodiments at node 206, the process control circuitry tests the relay circuitry as described above with FIG. 5 to determine the presence of a short circuit downstream of the relay circuitry. If a short circuit is present downstream (e.g., the voltage is below a threshold), the process control circuitry may not close the power relay so that the input power does not pass through the short circuit. The process control circuitry may open the bypass circuit at block 207 in case of a short downstream. After the bypass circuit opens, the voltage clamping device clamps the voltage at block 209 to at least partially protect the relay circuitry. The process control circuitry may send a signal at block 211 to the welding power source, the process operator interface, and/or the control operator interface. In some embodiments, the signal may control the welding power source to halt production of the input power. In other embodiments, the signal controls the operator interface to indicate a fault (e.g., short circuit) at block 213 to the operator. If the voltage of the bus power is above a threshold (e.g., the power storage circuitry is charged) and no short circuit is present, the process control circuitry sends a control signal to the power relay to close the first current path at step 208.

After the power relay is closed, at step 210 the process control circuitry sends a control signal to the bypass circuit to open the second current path. In some embodiments, the process control circuitry sends a signal to the welding power source at block 212. The signal directs the welding power source to increase the current of the input power to a greater level. In other embodiments, the welding power source is configured to increase the current to the greater level after a defined period of time after step 210. In some embodiments, the process control circuitry of the advanced process wire feeder may perform the steps 208 and 210 substantially simultaneously, or within less than approximately 50 milliseconds, less than approximately 30 milliseconds, or less than approximately 15 milliseconds. The advanced process wire feeder receives the input power at the greater level at block 214. The input power at the greater level is suitable for conversion to welding output at block 216 for a desired welding process.

Figure 9B:
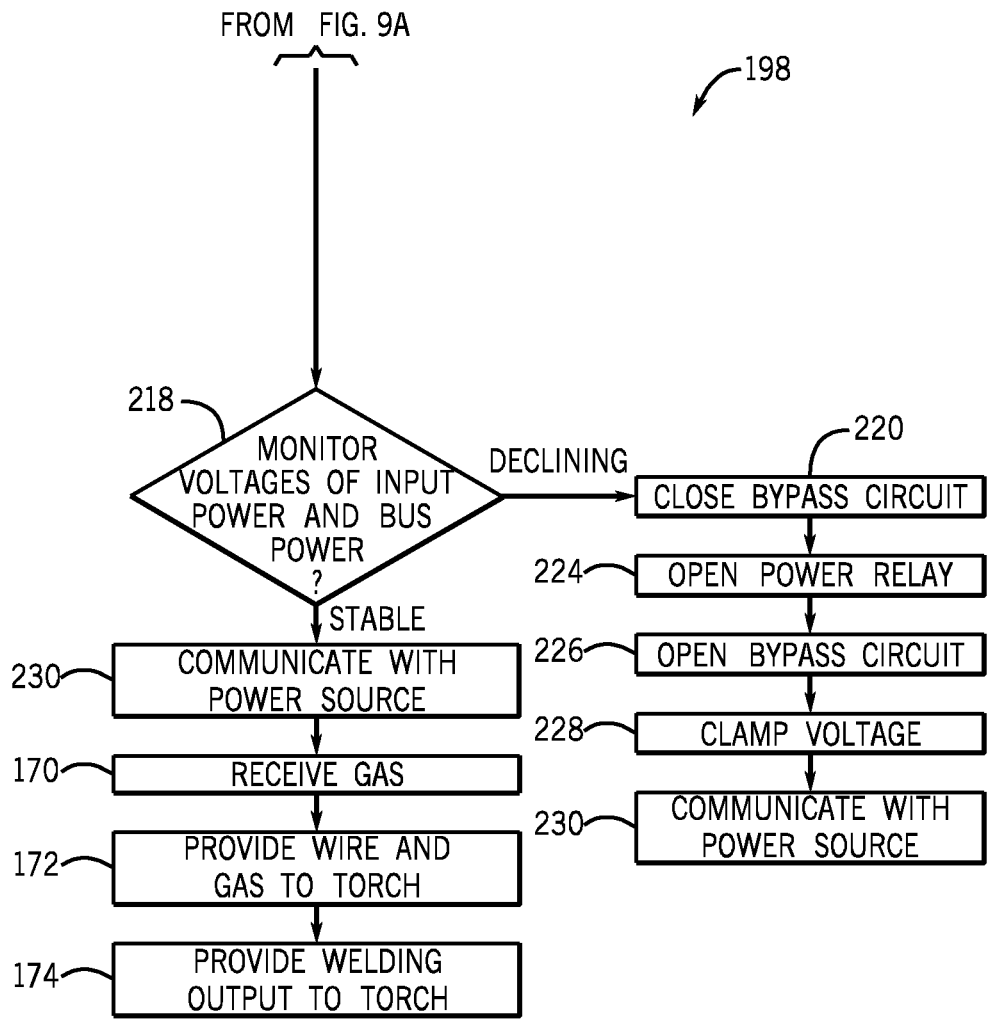
FIG. 9B is a second part of the flow chart of FIG. 9A of the process for actuating relay circuitry of the advanced process feeder.

The power conversion circuitry of the advanced process wire feeder converts the input power at the greater level to welding output at step 216. The welding output may be a controlled waveform welding output suitable for a short circuit or pulsed welding process. Additionally, the welding output may be suitable for a FCAW process or GMAW welding process. The welding output converted by the power conversion circuitry within the advanced process wire feeder is not attenuated by inductance of the power cable coupled to the welding power source. FIG. 9B illustrates a second part of the method 198 that may be configured during and after block 216. During a welding process, at node 218, sensing circuitry monitors voltages of input power and bus power to control the relay circuitry. In some embodiments, the sensing circuitry may also detect the polarity of the input power as described above with method 176 in FIG. 8 to notify the operator of a polarity mismatch or reverse the polarity at the welding power source.

If the sensing circuitry detects a declining voltage across the internal bus and/or a declining voltage of the input power, the process control circuitry actuates the relay circuitry in steps 220, 224, and 226 to interrupt the input power to the power conversion circuitry. The process control circuitry sends a control signal to the bypass circuit at step 220 to close the second current path. At the same time or shortly after step 220, the process control circuitry sends a control signal to the power relay at step 224 to open the first current path. The process control circuitry may discharge at least some of the power storage circuit to drive the power relay open. For example, the power storage circuit may store power to drive a magnetic coil to open power relay upon receipt of a control signal from the process control circuitry. After the power relay is open, at step 226 the process control circuitry sends a control signal to the bypass circuit to open the second current path. In some embodiments, the process control circuitry of the advanced process wire feeder may perform the steps 220, 224, and 226 substantially simultaneously, or within less than approximately 50 milliseconds, less than approximately 30 milliseconds, or less than approximately 15 milliseconds. After the first and second current paths are open, the voltage across the relay circuitry may increase due to power stored within the power cables and/or power storage circuit. A voltage clamping device of the relay circuitry clamps the voltage at block 228 to reduce the effects of the stored energy on the power relay or bypass circuit. Throughout the method 198, such as if the sensing circuitry detects stable voltages of the input power and bus power, the advanced process wire feeder may communicate with the welding power source at step 230. The advanced process wire feeder may direct the welding power source to adjust the input power (e.g., cease supplying the input power).

The advanced process wire feeder receives shielding gas at step 170. The shielding gas may be supplied through the welding power source or a separate gas supply. At step 172, the advanced process wire feeder provides the wire and gas to the welding torch. At step 174, the welding output is provided to the welding torch. The welding output provided may be suitable for a controlled waveform welding process because of the relatively short distance and low inductance between the power conversion circuitry and the welding torch.

Figure 10:
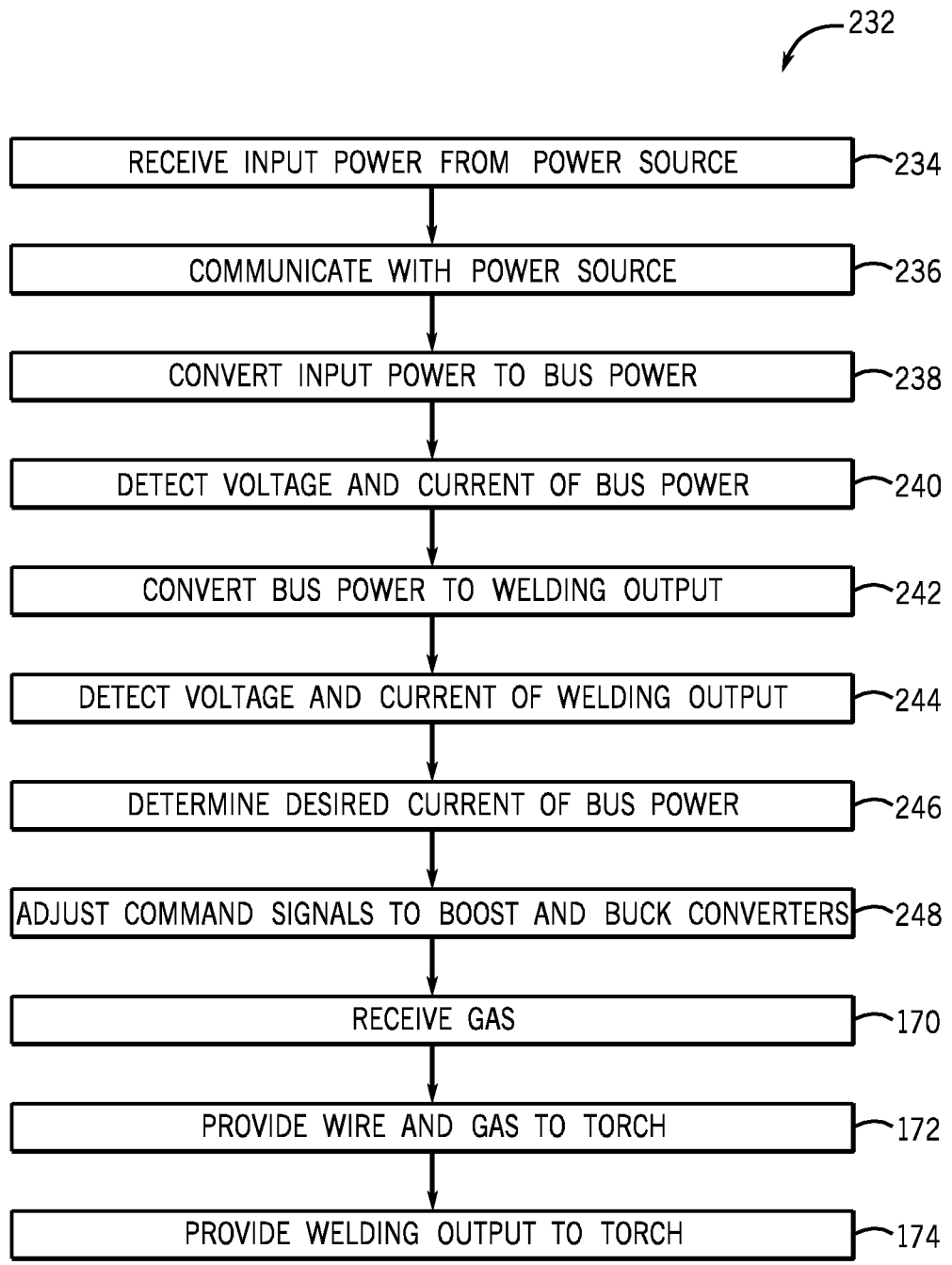
FIG. 10 is a flow chart of an embodiment of a process for adjusting power conversion circuitry of an advanced process wire feeder.

FIG. 10 illustrates a method 232 of controlling the current of the input power to reduce voltage ripple on the internal bus. The first step 234 of the method 232 is to receive input power from the welding power source. In some embodiments, the input power may be a polarized DC input power of approximately 80V. Throughout the method 232, the advanced process wire feeder may communicate with the welding power source as shown at step 236. The boost converter of the power conversion circuitry receives the input power and converts the input power to bus power at step 238. The bus power is transmitted from the boost converter to the buck converter along the internal bus. Sensing circuitry detects the current and voltage of the bus power at step 240. At step 242, the buck converter converts the bus power from the internal bus to welding output. The welding output may be a controlled waveform welding output suitable for a short circuit or pulsed welding process. Additionally, the welding output may be suitable for a FCAW process or GMAW welding process. The sensing circuitry also detects the current and voltage of the welding output at step 244.

The process control circuitry receives the detected currents and processes the detected measurements to adjust the power conversion circuitry. In some embodiments, the process control circuitry is configured to determine the desired current of bus power to reduce the voltage ripple across the internal bus. The process control circuitry may determine the desired current of bus power by determining the product of the welding output current and voltage, determining the sum of the product and a conversion loss, and dividing the sum by the bus voltage. The process control circuitry may adjust the command signals to the boost and buck converters at step 248 based on the detected current and voltage measurements from steps 240 and 244. In some embodiments, the process control circuitry adjusts the command signals to the power conversion circuitry to substantially match in time the bus power entering the internal bus with the bus power entering the buck converter. This reduces the voltage ripple across the internal bus. The process control circuitry is configured to adjust the current of the bus power based at least in part on the welding output. In some embodiments, the process control circuitry is configured to adjust the duty cycle of switches within the boost converter to advance or delay in time (e.g., phase shift) the conversion of input power to bus power. The process control circuitry is also configured to adjust the duty cycle of switches within the buck converter to advance or delay in time (e.g., phase shift) the conversion of bus power to welding output. In some embodiments, the process control circuitry is configured to dynamically adjust the boost converter and buck converter based on feedback to tune the voltage ripple to a minimum value. The process control circuitry is configured to tune the voltage ripple to the minimum value for any inductance of the power cables.

The advanced process wire feeder receives shielding gas at step 170. The shielding gas may be supplied through the welding power source or a separate gas supply. At step 172, the advanced process wire feeder provides the wire and gas to the welding torch. At step 174, the welding output is provided to the welding torch. The welding output provided may be suitable for a controlled waveform welding process because of the relatively short distance and low inductance between the power conversion circuitry and the welding torch.

Figure 11:
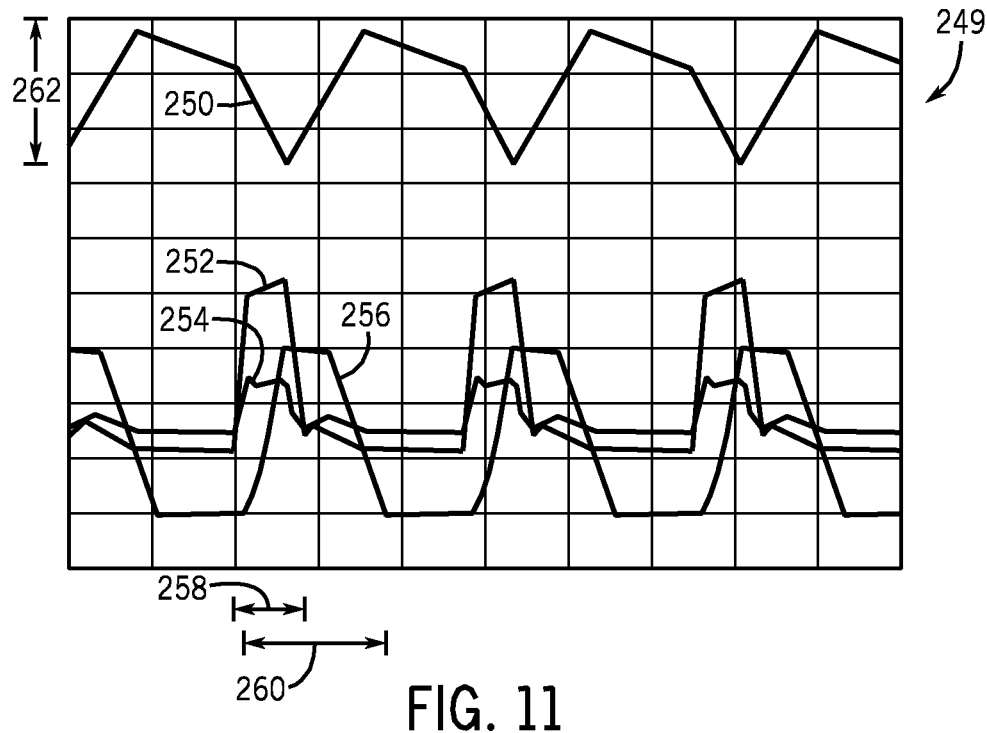
FIG. 11 is a chart of bus voltage, input current, output voltage, and output current versus time.

FIG. 11 is a chart 249 illustrating an embodiment of the bus voltage, input current, and welding output parameters versus time of the advanced process wire feeder without adjusting the power conversion circuitry. The chart 249 illustrates a series of input current pulses on the internal bus supplied by the boost converter, and the welding output drawn by the buck converter from the internal bus suitable for a controlled waveform welding process. The signal 250 is the voltage ripple as measured on the internal bus. The signal 252 is the output current of the welding output drawn by the buck converter, and the signal 254 is the output voltage of the welding output drawn by the buck converter. Signal 256 is the current of the converted bus power supplied by the boost converter from the input power. Each of the signals illustrated has a regular period, however, the output timing (e.g., phase) of the output current and voltages 252, 254 precedes the input timing (e.g., phase) of the bus current 256. That is, the timing of a peak 260 of the bus current 256 is offset (e.g., delayed) from the timing of peaks 258 of the welding output current 252 and welding output voltage 254. The relative time difference between the output peak 258 and the input peak 260 of the chart 249 causes the voltage ripple to have a large peak-to-peak amplitude 262.

Figure 12:
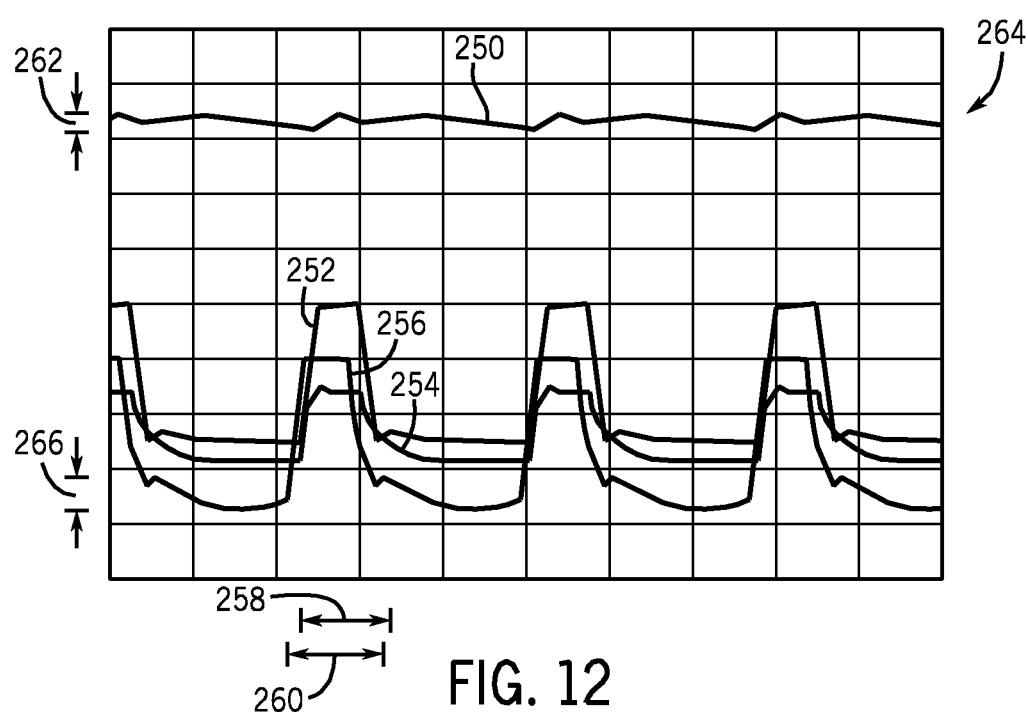
FIG. 12 is another chart of bus voltage, input current, output voltage, and output current versus time.

FIG. 12 is a chart 264 illustrating an embodiment of the bus voltage, input current, and welding output parameters versus time of the advanced process wire feeder for which the power conversion circuitry is adjusted to reduce the voltage ripple. In this embodiment, the peak-to-peak amplitude 262 of the voltage ripple 250 is substantially less than in chart 249 of FIG. 11. The process control circuitry controls the duty cycles of switches within the boost converter and/or the buck converter to reduce the voltage ripple 250. For example, the process control circuitry adjusts the timing of the output peak 258 of the output current and voltage, adjusts the timing of the input peak 260 of the bus current, or combinations thereof. FIG. 12 illustrate an embodiment in which the process control circuitry delays the timing of the output peak 258 to more closely coincide with the timing of the input peak 260, thereby reducing the peak-to-peak amplitude 262 of the voltage ripple 250. In some embodiments, the voltage ripple 250 is reduced when the input current 256 and input voltage signals are aligned in time with the output current 252 and the output voltage 254. The product of the input current 256 and the input voltage signals may be approximately equal to a sum of a conversion loss (e.g., from the boost converter and the buck converter) and the product of the output current 252 and the output voltage 254 signals. In some embodiments, the process control circuitry controls the conversion by the boost and buck converters to refine the shape of the pulsed waveforms to further reduce the voltage ripple. For example, the bus current 256 of the embodiment of chart 264 increases and decreases more rapidly than the embodiment of chart 249. Additionally, the process control circuitry may control the bus current 256 supplied by the boost converter to closely match the current of the welding output 252 drawn by the buck converter as illustrated in chart 264.

Figure 13:
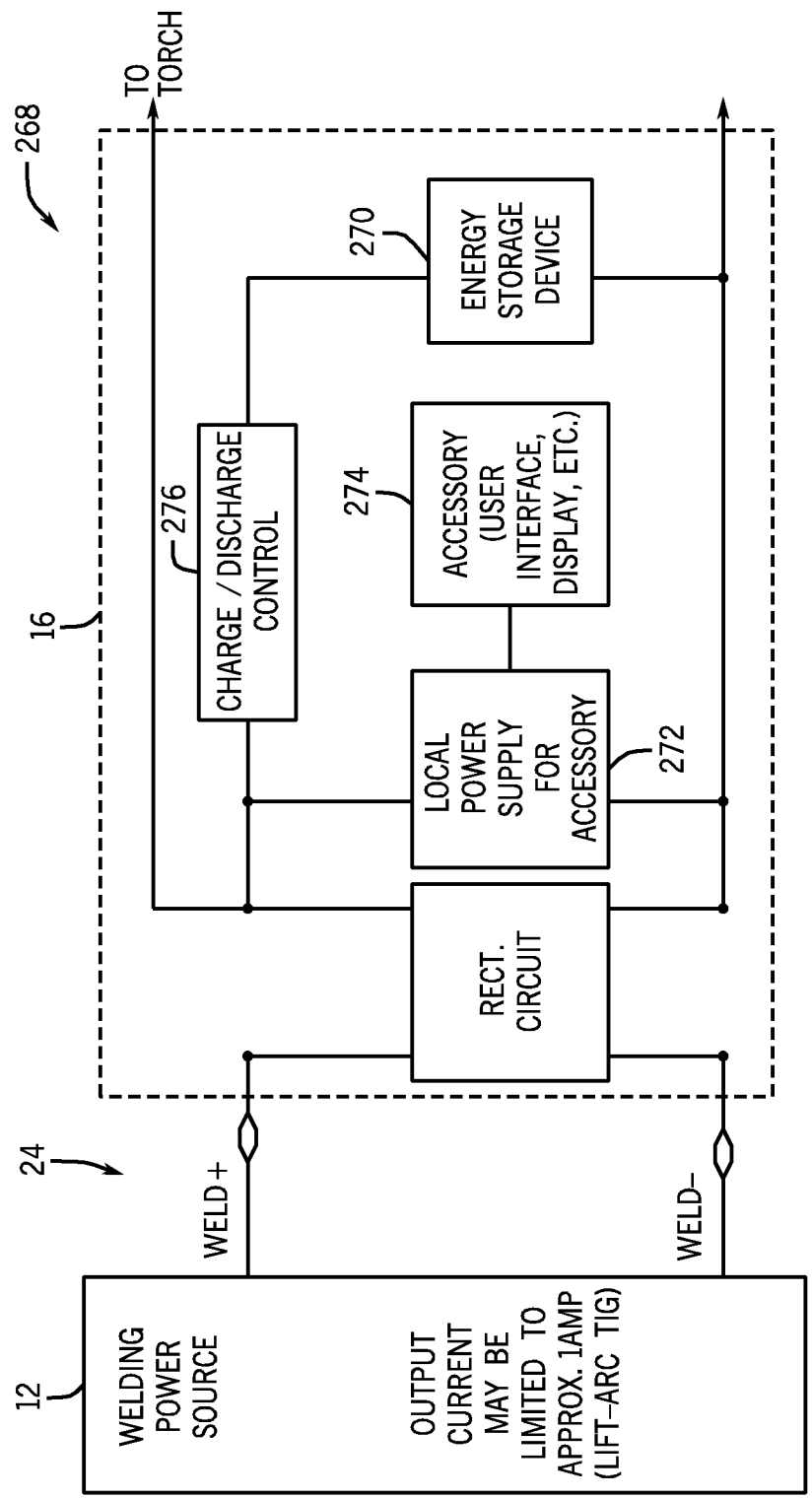
FIG. 13 is a diagram of an exemplary circuit for controlling application of power to a welding component such as a wire feeder or pendant during power-up or connection of the component to a welding power supply.

FIG. 13 illustrates an exemplary current management system as may be used in either a pendant coupled to a welding power source or in a remote wire feeder, of the types described above. The current management system, designated generally by reference numeral 268 is designed to be coupled to a welding power source 12 via a power cable 24. Because the welding power source 12 may often be live (i.e., powered and providing output power to the cables 24), the current management system 268 may serve multiple functions, such as to limit inrush current to energy storage devices within the remote component, and/or to delay application of current to the energy storage devices to avoid arcing at the terminal connections when the component is coupled to the live welding power source. In the illustrated embodiment, the current management system 268 comprises at least one energy storage device 270 coupled to a local power supply 272 within the component. The local power supply may be used to provide power for various accessories 274, such as user interfaces, displays, and so forth. The energy storage device 270 may comprise one or more types of devices, such as capacitors, batteries, combinations of these, or any other suitable energy storage devices. A charge/discharge control circuit 276 is also provided for regulating application of current to the energy storage device 270 and for regulating the flow of power from the energy storage device. These devices may be coupled in a bussed circuit arrangement as illustrated, with welding power being provided to a welding torch in parallel with this circuitry. Moreover, current and voltage sensors may be incorporated into the circuitry for regulating operation of certain of the components, particularly during initial connection of the pendant or wire feeder to a power source and also during operation.

As described more fully below with reference to FIGS. 14 and 15, the current management system 268 serves to limit current into the energy storage device by operation of the charge/discharge control circuit. In particular, during use, the circuitry may ensure that the welding power output does not "starve" the local power supply 272, such as during arc starting (e.g., lift-arc starting in TIG operations). Moreover, the current draw can be made low enough via the circuitry to prevent arcing when the pendant or wire feeder is connected to a live welding power source. So further, energy from the energy storage device may be used to maintain power to the accessory 274 during loss of open circuit voltage (i.e., "ride-through").

Figure 14:
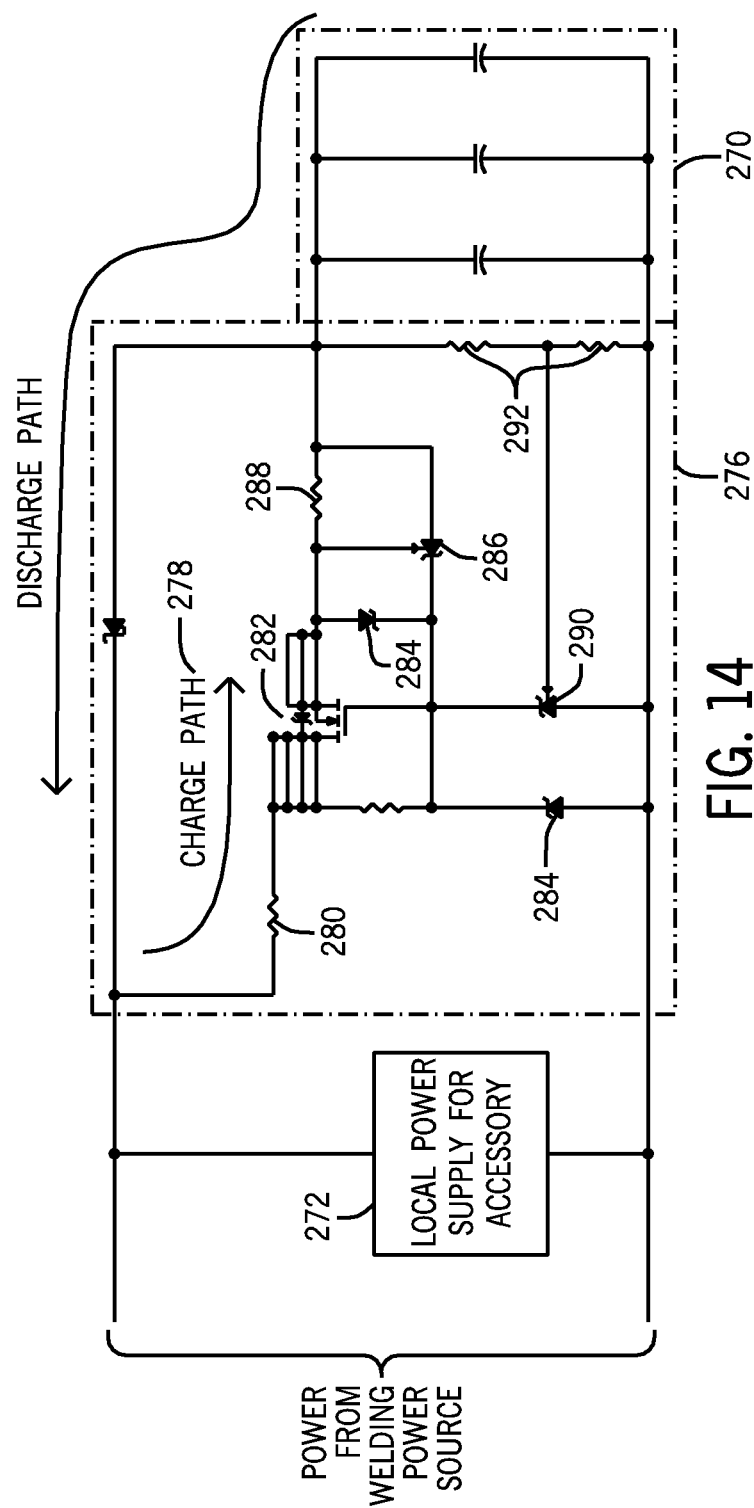
FIG. 14 is a somewhat more detailed diagram of an exemplary circuit for controlling inrush current to a welding pendant.

FIG. 14 illustrates an exemplary charge/discharge control circuit 276 such as may be suitable for a limiting inrush current to a remote component, such as a welding pendant. The energy storage device 270 is here illustrated as a series of capacitors. A charge path 278 is defined through a resistor 280 and a switch 282. In the illustrated embodiment, the resistor 280 is a relatively low resistance, such as 100 Ohms, although any suitable resistance could be used, and the switch 282 comprises a MOSFET, although any suitable switch may be used. The resistor 280 will initially limit the flow of current to the capacitors upon connection of the component to a live power source. Current to the capacitors is limited by resistor 280 and by switch 282 under control of a Zener diode 286 (or another device, such as a circuit that mimics aspects of a Zener diode and an error amplifier in combination). This current can be made low enough by selection of the individual electrical components to prevent arcing when the pendant is connected to a welding power source open current voltage. Diodes 284 are provided for protection purposes. A current-limiting effect is provided by diode 286 (or other device as mentioned above) and a resistor 288 that act together to limit current by modulating the conductive state of switch 282. In a current circuit design, for example, the current flow is not allowed to exceed approximately 0.5 Amps. That is, switch 282 allows for charging of the capacitors, and this switch is maintained in a conductive state, but is throttled back to a limited current by interaction of components 286 and 288.

Moreover, an additional diode 290 (which again may be a circuit that mimics aspects of a diode in combination with an error amplifier) and additional resistors 292 are provided that act together to limit voltage. That is, these components as coupled in the illustrated diagram act to reduce the bias of switch 282 to effectively limit the voltage of the device. Consequently, relatively low voltage capacitors may be utilized.

In operation, the circuitry effectively limits the inrush of current when the component is initially coupled to a live power source, in this case any spark being limited to approximately 0.5 Amps. The storage devices, in this case a series of capacitors, are then allowed to charge. Thereafter, "ride-through" capabilities are provided by the capacitors which feed the local power supply 272 during a loss of welding power through a diode. It should be noted that the circuitry illustrated in FIG. 14, and indeed that of FIG. 13 and FIG. 15 described below are intended to be in addition to any other circuitry provided in the remote component, whether a pendant or wire feeder. That is, those components may nevertheless include various sensing, processing, control, wire feed, and other circuitry of the types described above.

Figure 15:
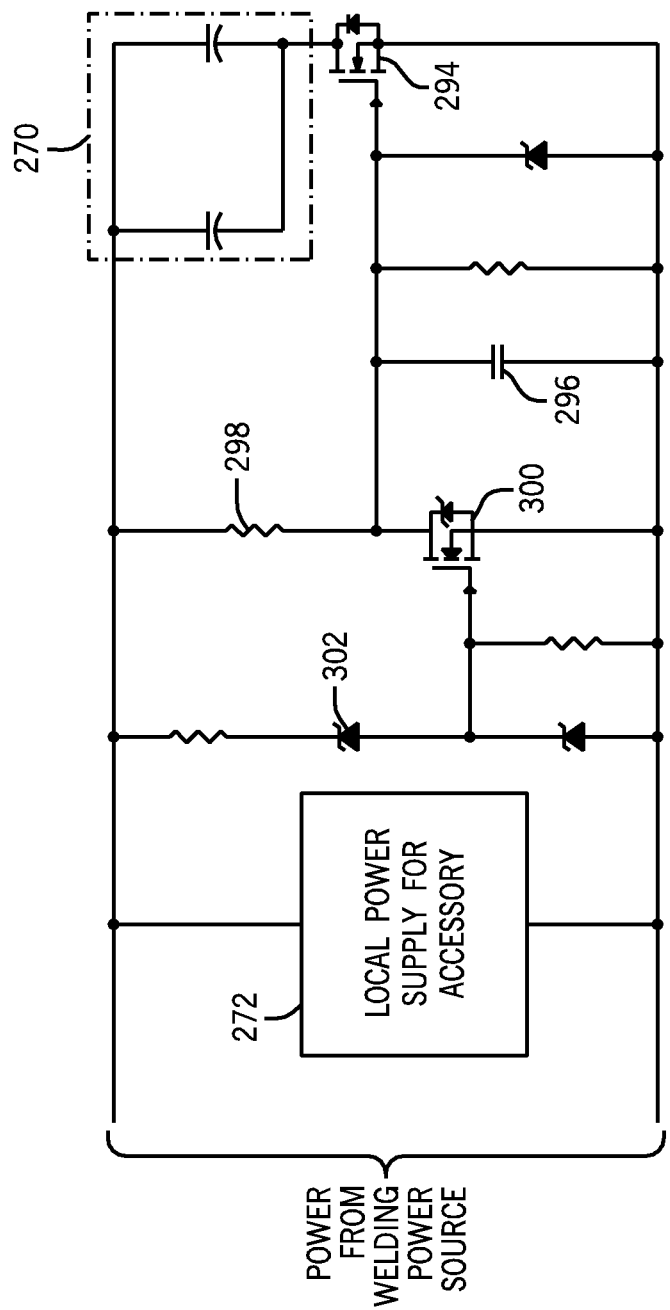
FIG. 15 is a similar detailed diagram of an exemplary circuit for controlling inrush current to a welding wire feeder.

FIG. 15 illustrates another exemplary circuit that may be used for current and/or power management in a remote device, in this case is particularly well-suited to a wire feeder of the type described above. The circuitry also includes a local power supply 272, as well as storage devices 270, in this case multiple capacitors. The application of current into the capacitors is delayed until a further capacitor 296 is charged through a resistor 298 to a gate threshold of a solid state switch 294. This delay, then, prevents or reduces the likelihood of arcing when the component is initially coupled to a live welding power source. Moreover, a voltage across the capacitors is effectively limited by interaction of a second solid state switch 300 and a diode 302. That is, when the diode 302 changes to a conductive state, the gate of switch 300 is powered, placing switch 294 in a non-conductive state. Current out of the capacitors passes through the internal diode of the package of switch 294.

Various enhancements to the circuitry of FIG. 15 may be easily envisaged, for example, a comparator could be provided between switch 294 and capacitor 296 to provide a "snap-on" operation in which the linear mode of switch 294 is effectively avoided. The circuitry thus provides a bi-directional, low impedance energy storage arrangement that effectively reduces or avoids arcing upon initial connection, while providing the desired local power supply capabilities and ride-through capabilities during operation.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A welding wire feeder comprising:
a welding wire feed drive configured to drive a welding wire towards a welding application;
wire feed control circuitry electrically coupled to the welding wire feed drive and configured to control the drive of the welding wire towards the welding application;
power conversion circuitry configured to receive input power from a power source, the power conversion circuitry comprising:
a boost converter configured to receive the input power and to convert the input power to bus power applied to an internal bus of the power conversion circuitry;
a buck converter electrically coupled to the internal bus and configured to convert the bus power to welding output suitable for a welding application; and
the internal bus electrically coupled between the boost converter and the buck converter;
input voltage and current sensors configured to measure input voltage and input current of the input power from the power source, respectively;
output voltage and current sensors configured to measure output voltage and output current of the welding output from the power conversion circuitry, respectively; and
control circuitry electrically coupled to the boost converter, to the buck converter, and to sensing circuitry, wherein the sensing circuitry is connected to the input voltage and current sensors, to the output voltage and current sensors, and to the internal bus, and wherein the control circuitry is configured to drive the boost converter to reduce voltage ripple on the internal bus based upon at least one of the input voltage, the input current, the output voltage, or the output current.

2. The welding wire feeder of claim 1, wherein the control circuitry is configured to determine a product of the output current and output voltage, to determine a sum of the product and a conversion loss, to divide the sum by the input voltage to determine a desired input current, and to drive the boost converter to control the input current.

3. The welding wire feeder of claim 1, wherein the control circuitry is configured to control the buck converter to produce welding output for a controlled waveform welding process, and wherein the control circuitry drives the boost converter to reduce voltage ripple on the internal bus at least during the controlled waveform welding process.

4. The welding wire feeder of claim 3, wherein the controlled waveform welding process comprises a pulsed welding process.

5. The welding wire feeder of claim 4, wherein the control circuitry is configured to adjust a relative timing of command signals to the boost converter and to the buck converter to reduce voltage ripple on the internal bus.

6. The welding wire feeder of claim 5, wherein the control circuitry is configured to control the boost converter to apply the bus power to the internal bus at a first time, the control circuitry is configured to control the buck converter to draw the bus power from the internal bus at a second time.

7. The welding wire feeder of claim 1, comprising bus voltage and current sensors configured to measure bus voltage and bus current of the bus power, respectively, and the control circuitry is configured to drive the boost converter to reduce voltage ripple on the internal bus based upon the bus current or bus voltage.

* * * * *